US00RE48723E

(19) United States
(12) Reissued Patent
Heid et al.

(10) Patent Number: US RE48,723 E
(45) Date of Reissued Patent: Sep. 7, 2021

(54) SILL PAN

(71) Applicant: Endura Products, LLC, Colfax, NC (US)

(72) Inventors: George Heid, Charlotte, NC (US); Tomasz Jaskiewicz, Oak Ridge, NC (US)

(73) Assignee: Endura Products, LLC, Colfax, NC (US)

(21) Appl. No.: 16/718,306

(22) Filed: Dec. 18, 2019

Related U.S. Patent Documents

Reissue of:
(64) Patent No.: 9,845,634
Issued: Dec. 19, 2017
Appl. No.: 15/392,679
Filed: Dec. 28, 2016

U.S. Applications:
(60) Provisional application No. 62/279,032, filed on Jan. 15, 2016.

(51) Int. Cl.
*E06B 1/70* (2006.01)
*E06B 7/14* (2006.01)
*E06B 1/62* (2006.01)

(52) U.S. Cl.
CPC ..... *E06B 1/70* (2013.01); *E06B 7/14* (2013.01); *E06B 1/702* (2013.01); *E06B 1/705* (2013.01); *E06B 2001/628* (2013.01)

(58) Field of Classification Search
CPC ..... E06B 7/14; E06B 1/70; E06B 2001/628; E06B 1/705; E06B 1/702
See application file for complete search history.

(56) References Cited

U.S. PATENT DOCUMENTS

| | | | | |
|---|---|---|---|---|
| 212,511 | A | 2/1879 | Stewart | |
| 385,065 | A | 6/1888 | Milroy | |
| 586,467 | A * | 7/1897 | Vogel | E06B 1/70 49/471 |
| 665,958 | A | 1/1901 | Dugan | |
| 1,677,130 | A | 6/1928 | Cherry | |
| 2,167,958 | A | 8/1939 | Oftedal et al. | |

(Continued)

FOREIGN PATENT DOCUMENTS

| | | |
|---|---|---|
| EP | 0550089 | 7/1993 |
| JP | 04174186 | 6/1992 |

OTHER PUBLICATIONS

SureSill, Ltd., Sloped Sill Pan Flashing for Window & Door Installation, www.suresill.com, known at least as early as Mar. 22, 2005, 29 pages.

(Continued)

*Primary Examiner* — Terrence R Till
(74) *Attorney, Agent, or Firm* — Womble Bond Dickinson (US) LLP

(57) ABSTRACT

A sill pan is disclosed that is configured for use in spanning rough openings of various lengths. The sill pan includes a base, a pre-formed end flange integral with and extending upwardly from a side edge of the base, a first connector portion formed in the base adjacent to the pre-formed end flange, and a second connector portion formed in the base adjacent to an end opposite to the pre-formed end flange. The sill pan is configured be attachable to an adjacent sill pan with one of the first connector portion and the second connector portion.

20 Claims, 22 Drawing Sheets

(56) References Cited

U.S. PATENT DOCUMENTS

| | | | | |
|---|---|---|---|---|
| 2,245,965 | A | 6/1941 | Cunin | |
| 2,575,657 | A | 11/1951 | Curley | |
| 2,648,107 | A * | 8/1953 | Bates, Jr. | E06B 7/26 52/97 |
| 2,696,028 | A | 12/1954 | Wallace | |
| 2,722,724 | A | 11/1955 | Miller | |
| 2,818,614 | A | 1/1958 | Lapka, Jr. | |
| 2,875,481 | A | 3/1959 | Erkkila | |
| 2,999,280 | A | 9/1961 | Miller | |
| 3,032,839 | A | 5/1962 | Miller | |
| RE25,590 | E | 6/1964 | Miller | |
| 3,410,027 | A | 11/1968 | Bates | |
| 3,593,473 | A | 7/1971 | King | |
| 3,667,192 | A | 6/1972 | Sewell | |
| 3,811,238 | A | 5/1974 | Brinker | |
| 3,900,967 | A | 8/1975 | Bursk et al. | |
| 4,055,917 | A | 11/1977 | Coller | |
| 4,079,550 | A | 3/1978 | Bursk et al. | |
| 4,237,664 | A | 12/1980 | Wilmes | |
| 4,573,287 | A | 3/1986 | Hagemeyer et al. | |
| 4,590,723 | A | 5/1986 | Nassau et al. | |
| 4,831,779 | A | 5/1989 | Kehrli et al. | |
| 4,945,680 | A | 8/1990 | Giguere | |
| 5,067,279 | A | 11/1991 | Hagemeyer | |
| 5,136,814 | A | 8/1992 | Headrick | |
| 5,179,804 | A | 1/1993 | Young | |
| 5,283,977 | A | 2/1994 | Smith | |
| 5,426,894 | A | 6/1995 | Headrick | |
| 5,517,788 | A | 5/1996 | McGough et al. | |
| 5,524,391 | A | 6/1996 | Joffe et al. | |
| 5,542,217 | A | 8/1996 | Larivee, Jr. | |
| 5,581,959 | A | 12/1996 | Occhipintl | |
| 5,588,266 | A | 12/1996 | Headrick | |
| 5,611,173 | A | 3/1997 | Headrick et al. | |
| 5,638,641 | A | 6/1997 | Joffe et al. | |
| 5,647,172 | A | 7/1997 | Rokicki | |
| 5,653,072 | A | 8/1997 | Seelandt-Stasek et al. | |
| 5,822,923 | A | 10/1998 | Governale | |
| 5,887,387 | A | 3/1999 | Dallaire | |
| 5,921,038 | A | 7/1999 | Burroughs et al. | |
| 5,943,825 | A | 8/1999 | Procton et al. | |
| 5,956,909 | A | 9/1999 | Chou | |
| 6,044,600 | A | 4/2000 | McCollough | |
| 6,052,949 | A | 4/2000 | Procton et al. | |
| 6,125,599 | A | 10/2000 | Mees et al. | |
| 6,216,395 | B1 | 4/2001 | Kelly | |
| 6,269,591 | B1 | 8/2001 | Kelly | |
| 6,371,188 | B1 | 4/2002 | Baczuk et al. | |
| 6,385,925 | B1 | 5/2002 | Wark | |
| 6,401,402 | B1 | 6/2002 | Williams | |
| 6,412,227 | B1 | 7/2002 | De Zen | |
| 6,625,941 | B2 | 9/2003 | Shaw | |
| 6,637,158 | B2 | 10/2003 | Bennett | |
| 6,715,248 | B2 | 4/2004 | Biebuyck | |
| 6,763,639 | B2 | 7/2004 | Bennett et al. | E06B 1/6092 160/92 |
| 6,789,358 | B2 | 9/2004 | Procton et al. | |
| 7,140,154 | B2 | 11/2006 | Governale et al. | |
| 7,201,820 | B2 | 4/2007 | Wiercinski | |
| 7,222,462 | B2 | 5/2007 | Ellingson | |
| 7,350,336 | B2 * | 4/2008 | Bennett | E06B 1/70 49/467 |
| 7,367,164 | B2 | 5/2008 | Burton et al. | |
| 7,591,106 | B2 | 9/2009 | Conlin | |
| 7,775,004 | B2 | 8/2010 | Allen | |
| 7,785,684 | B2 | 8/2010 | Halle | |
| 7,874,106 | B2 | 1/2011 | Pangburn et al. | |
| 7,877,940 | B2 | 2/2011 | Meeks et al. | |
| 7,877,945 | B2 | 2/2011 | Eggen et al. | |
| 8,065,839 | B2 | 11/2011 | Conlin | |
| 8,117,789 | B2 | 2/2012 | Teodorovich | |
| 8,161,689 | B1 | 4/2012 | Butzen | |
| 8,443,554 | B1 | 5/2013 | Teodorovich | |
| 8,530,037 | B2 | 9/2013 | Halle | |
| 8,677,636 | B2 | 3/2014 | Kelley | |
| 8,695,293 | B2 | 4/2014 | Teodorovich | |
| 8,857,107 | B1 * | 10/2014 | Key | E06B 1/70 49/460 |
| 9,194,170 | B2 | 11/2015 | Eis et al. | |
| 9,359,811 | B2 * | 6/2016 | Hughes | E06B 1/702 |
| 2003/0106269 | A1 * | 6/2003 | Bauman | E06B 3/9632 49/467 |
| 2004/0200152 | A1 | 10/2004 | Khanlarian | |
| 2004/0200153 | A1 | 10/2004 | Khanlarian | |
| 2004/0250486 | A1 | 12/2004 | Sibbett | |
| 2005/0055912 | A1 | 3/2005 | Teodorovich | |
| 2005/0217189 | A1 * | 10/2005 | Moffitt | E06B 7/14 52/209 |
| 2005/0268569 | A1 * | 12/2005 | Teodorovich | E06B 1/62 52/211 |
| 2006/0101726 | A1 | 5/2006 | Collins | |
| 2006/0150521 | A1 * | 7/2006 | Henry | E06B 1/70 49/471 |
| 2006/0230593 | A1 | 10/2006 | Eggen et al. | |
| 2009/0056241 | A1 * | 3/2009 | Koessler | E06B 1/62 52/97 |
| 2010/0058683 | A1 * | 3/2010 | Bushberger | E06B 1/705 52/209 |
| 2012/0144761 | A1 * | 6/2012 | Teodorovich | E06B 1/702 52/62 |
| 2012/0151870 | A1 * | 6/2012 | Summy | E04F 21/0038 52/741.4 |
| 2013/0305610 | A1 * | 11/2013 | Meeks | E06B 7/26 49/471 |
| 2014/0021646 | A1 | 1/2014 | Halle | |
| 2014/0190099 | A1 * | 7/2014 | Hopkins, II | E06B 7/231 52/204.5 |
| 2015/0075245 | A1 | 3/2015 | Murphy | |

OTHER PUBLICATIONS

Universal Sillpan, Vinyl Visions, http://www.vinylvisions.net/products/sillpans1.html, known at least as early as Dec. 27, 2016, 1 pg.

Jamsill Guard, http://www.jambsill.com/, known at least as early as Mar. 24, 2011, 1 pg.

Weather Out Flashing, http://www.weatheroutflashing.com/, known at least as early as Mar. 24, 2011, 2 pgs.

DamSill, The Ultimate Window Pan., http://www.damsil.com/, known at least as early as Mar. 24, 2011, 1 pg.

Astro Plastics, AstroPan, http://www.astroplastics.com/astro_pan.htm, known at least as early as Mar. 24, 2011, 3 pgs.

SillSaver, The Patented Sloping Window Sill Pan, http://web.archive.org/web20110202102817/http://sillsaver.com/, known at least as early as Mar. 24, 2011, 1 pg.

TLS Labs, Corner Flash GS Series, Lightning Flash Flashing Corners, Lightning Flash XL, http://www.tlslabs.com/product-detail&id=gs100a, known at least as early as Mar. 24, 2011, 2 pgs.

Dow Building Solutions, Weathermate Sill Pan, http://building.dow.com/na/en/products/specialty/wmsillpan.htm, known at least as early as Mar. 24, 2011, 1 pg.

SillGuard, Marvin Windows and Doors, http://www.marvin.com/?page=SillGuard, known at least as early as Mar. 24, 2011, 1 pg.

Moistop Corner Shield, Fortifiber Building Systems Group, http://www.fortifiber.com/moistop_corner_shield.html, known at least as early as Mar. 24, 2011, 2 pgs.

DuPont Weatherization Systems, Dupont Flashing Systems, http://www2.dupont.com/Tyvek_Weatherization/en_US/products/residential/resi_flashing_systems.html, known at least as early as Mar. 24, 2011, 2 pgs.

SureSill, Sloped Sill Pan for Windows Doors, http://suresill.com/home.html, known at least as early as Mar. 24, 2011, 2 pgs.

* cited by examiner

SILL PAN

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

TECHNICAL FIELD

The present disclosure relates to building products, particularly building products used in entryways to limit water infiltration. More particularly, the present disclosure relates to sill pans for lining at least a portion of a rough opening into a building.

BACKGROUND

Builders often apply sill pans, sometimes referred to more generally as flashing, to some or all of a rough opening in a building. Sill pans act as an added barrier against moisture infiltration. In some instances, sill pans are disposed between the bottom of a rough opening, e.g. a sub-floor, and a threshold, door sill, or window.

Sill pans are traditionally sold with predetermined dimensions, requiring users to know and/or determine the depth or width of the rough opening in order to ensure proper sill pan sizing. Alternatively, builders or retailers may be forced to stock sill pans in multiple sizes to accommodate variations in rough opening dimensions. Some sill pans have been developed that provide adjustability in the depth or width dimension, but these existing adjustable sill pans can be cumbersome to install. For example, multiple unique components are often required to assemble the finished sill pan configuration, with each mating joint requiring proper sealing to avoid water leaking to the sub-floor and the building interior. Additionally, many sill pans do not have an ability to promote water drainage toward the exterior of the building envelope.

There remains a need for a sill pan that provides for use in rough openings of a range of dimensions while being easy to install in a manner that helps prevent water or moisture from leaking to the sub-floor or into the building.

SUMMARY

One embodiment of the present disclosure includes a sill pan configured for use in spanning rough openings of various lengths. The sill pan can comprise a base, a pre-formed end flange integral with and extending upwardly from a side edge of the base, a first connector portion formed in the base adjacent to the pre-formed end flange, and a second connector portion formed in the base adjacent to an end opposite to the pre-formed end flange. The sill pan is configured be attachable to an adjacent sill pan with one of the first connector portion and the second connector portion.

Another embodiment of the present disclosure includes a method of flashing a rough opening with two sill pans, each sill pan being initially identical, and each sill pan comprising a base, a pre-formed end flange integral with and extending upwardly from a side edge of the base, a first connector portion formed in the base adjacent to the pre-formed end flange, and a second connector portion formed in the base adjacent to an opposite side edge of the base. The method can comprise removing the pre-formed end flange from a first sill pan of the two sill pans, and connecting the first connector portion of the first sill pan to the second connector portion of a second sill pan of the two sill pans.

These and other aspects of the present invention will become apparent to those skilled in the art after a reading of the following description of the preferred embodiments, when considered in conjunction with the drawings. It should be understood that both the foregoing general description and the following detailed description are explanatory only and are not restrictive of the invention as claimed.

DETAILED DESCRIPTION

Exemplary embodiments of this disclosure are described below and illustrated in the accompanying figures, in which like numerals refer to like parts throughout the several views. The embodiments described provide examples and should not be interpreted as limiting the scope of the invention. Other embodiments, and modifications and improvements of the described embodiments, will occur to those skilled in the art and all such other embodiments, modifications and improvements are within the scope of the present invention. Features from one embodiment or aspect may be combined with features from any other embodiment or aspect in any appropriate combination. For example, any individual or collective features of method aspects or embodiments may be applied to apparatus, product or component aspects or embodiments and vice versa.

Figure 1:
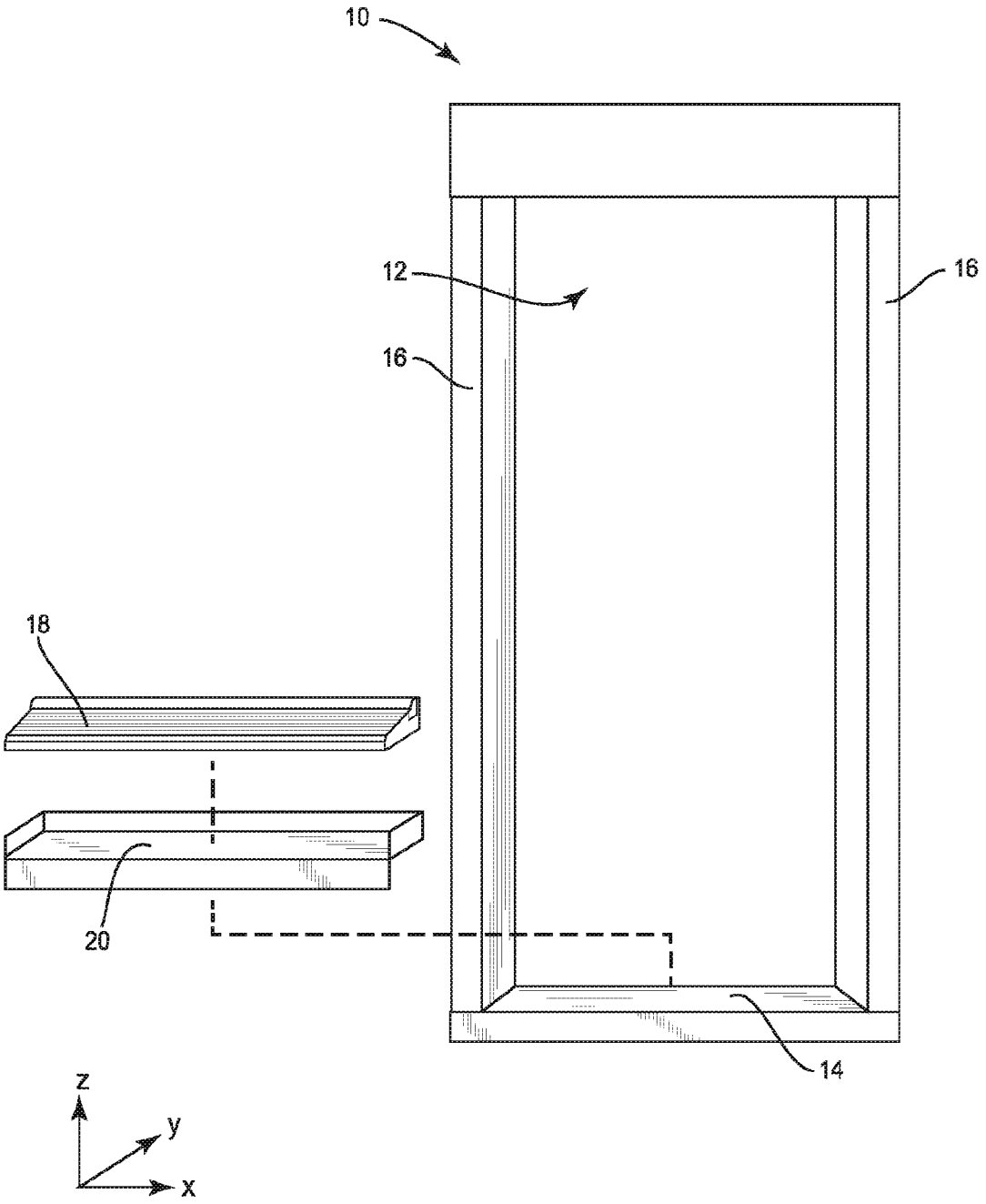
FIG. 1 is an exploded exterior perspective view of an entryway having a sill pan.

FIG. 1 shows an exploded view of an exemplary entryway 10 having a rough opening 12 defined at least partially by a sub-floor 14 and a pair of vertical wall studs 16 extending upwardly from the sub-floor. Sheetrock may be applied to each of the wall studs 16 to close of portions of a wall surrounding the rough opening 12. Flashing, particularly a sill pan 20, is configured to be fit upon the sub-floor 14 and assist with sealing the joints between the sub-floor and the wall studs 16. A threshold 18 may be installed upon the sill pan 20, where the sill pan may act as a moisture barrier below the threshold for providing additional protection from water infiltration to the sub-floor 14 or into a building through the entryway 10. While embodiments of the sill pan 20 are shown and described herein for use under a doorway threshold, one skilled in the art will understand that the sill pan may be used with other door or even other window components generally as flashing between the rough opening 12 and the frame of the door or window.

As used herein, the length direction corresponds to the dimension between the studs 16 (see the X-axis in FIG. 1). The width direction corresponds to the dimension through the entryway 10 perpendicular to the length (see the Y-axis in FIG. 1). Lastly, the height direction corresponds to vertical (see the Z-axis in FIG. 1). As discussed above, the dimensions of rough openings can vary significantly. The length of the rough opening may not only correspond with the width of a single door panel, but may also span a length for a French door entryway or an entryway configured to include one or more sidelight panels. Regional building codes, building materials, residential versus commercial construction, and other factors may also result in a variety of possible entryway widths (also called depths) corresponding to varying thicknesses of exterior building walls.

Figure 2:
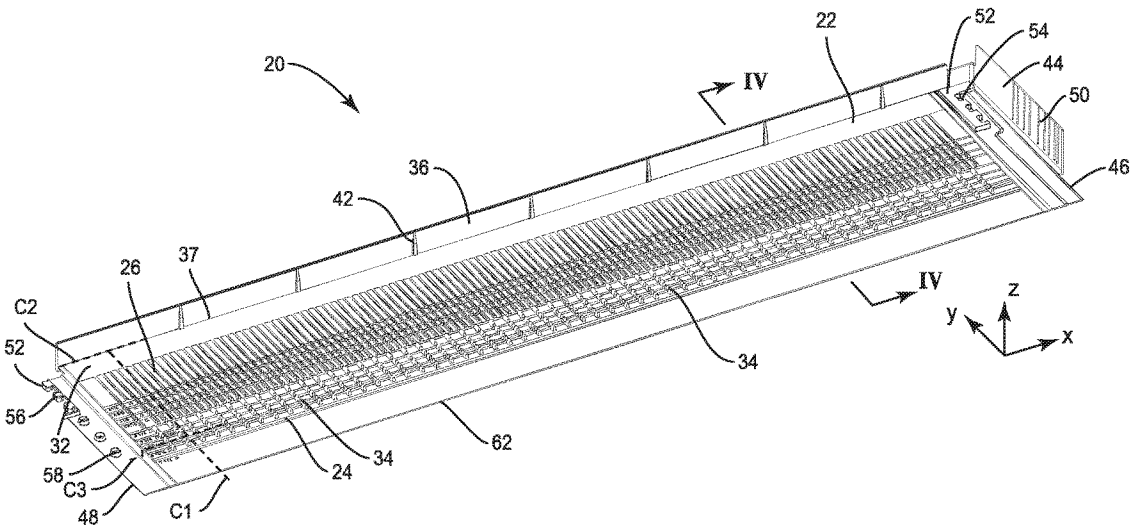
FIG. 2 is a top left perspective view of a sill pan according to one embodiment of the present disclosure.
Figure 3:
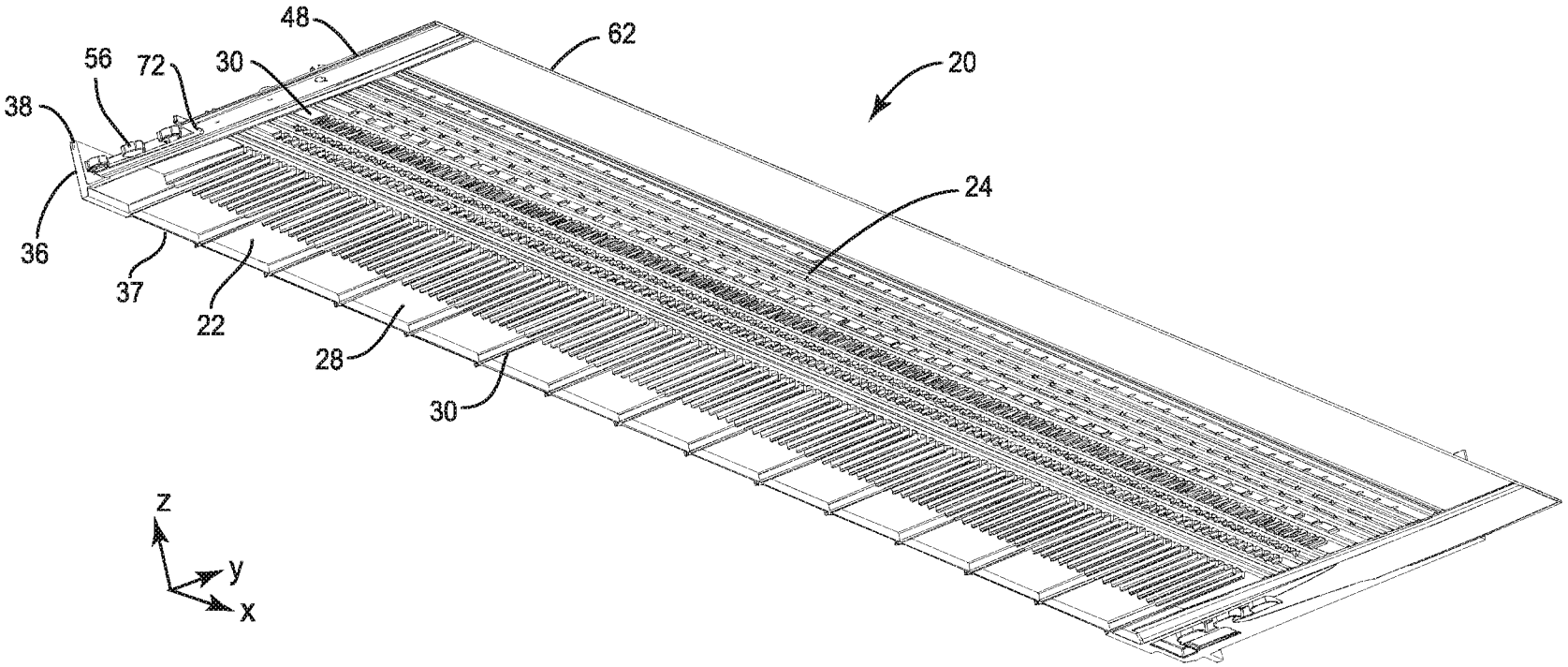
FIG. 3 is a bottom left perspective view of the sill pan of FIG. 2.
Figure 4:
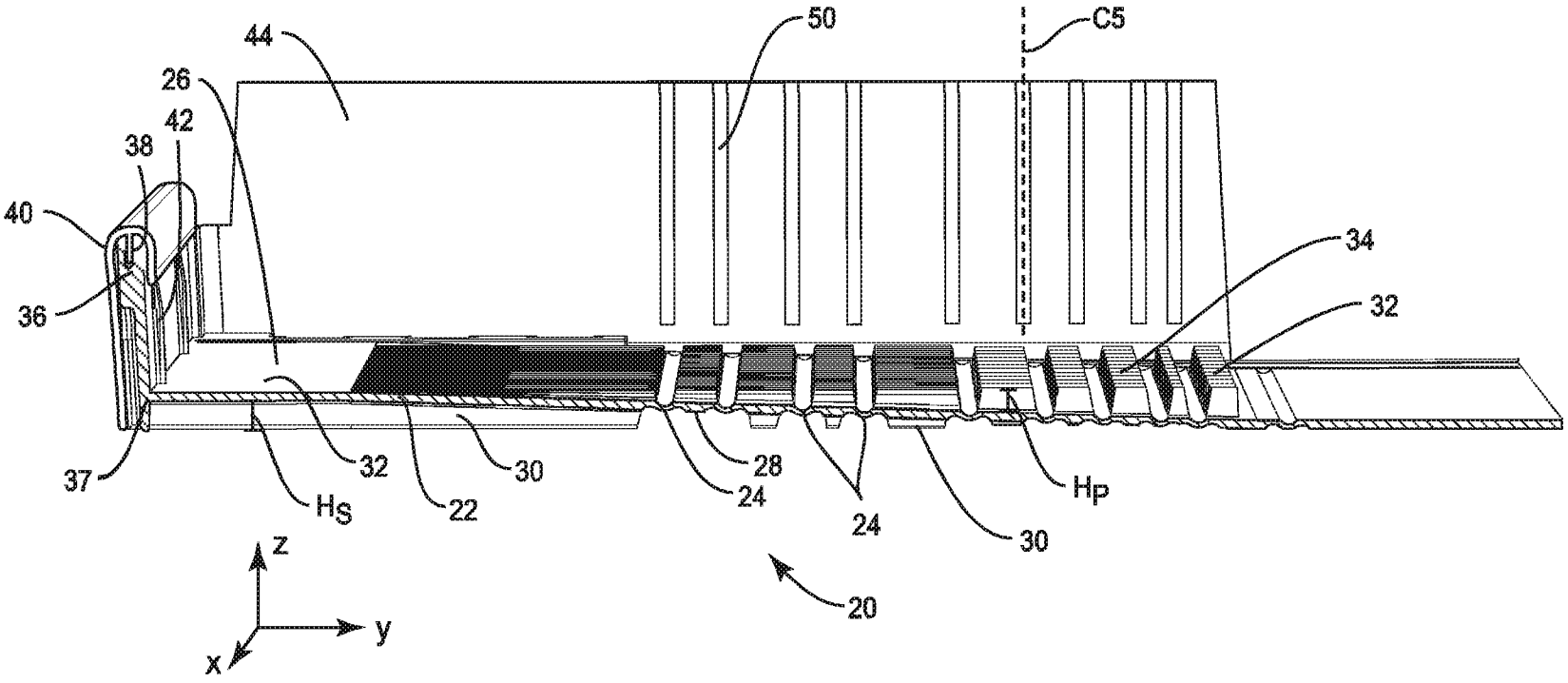
FIG. 4 is a cross sectional view of the sill pan of FIG. 2 along line IV-IV with a nosing cover attached thereto.
Figure 5:
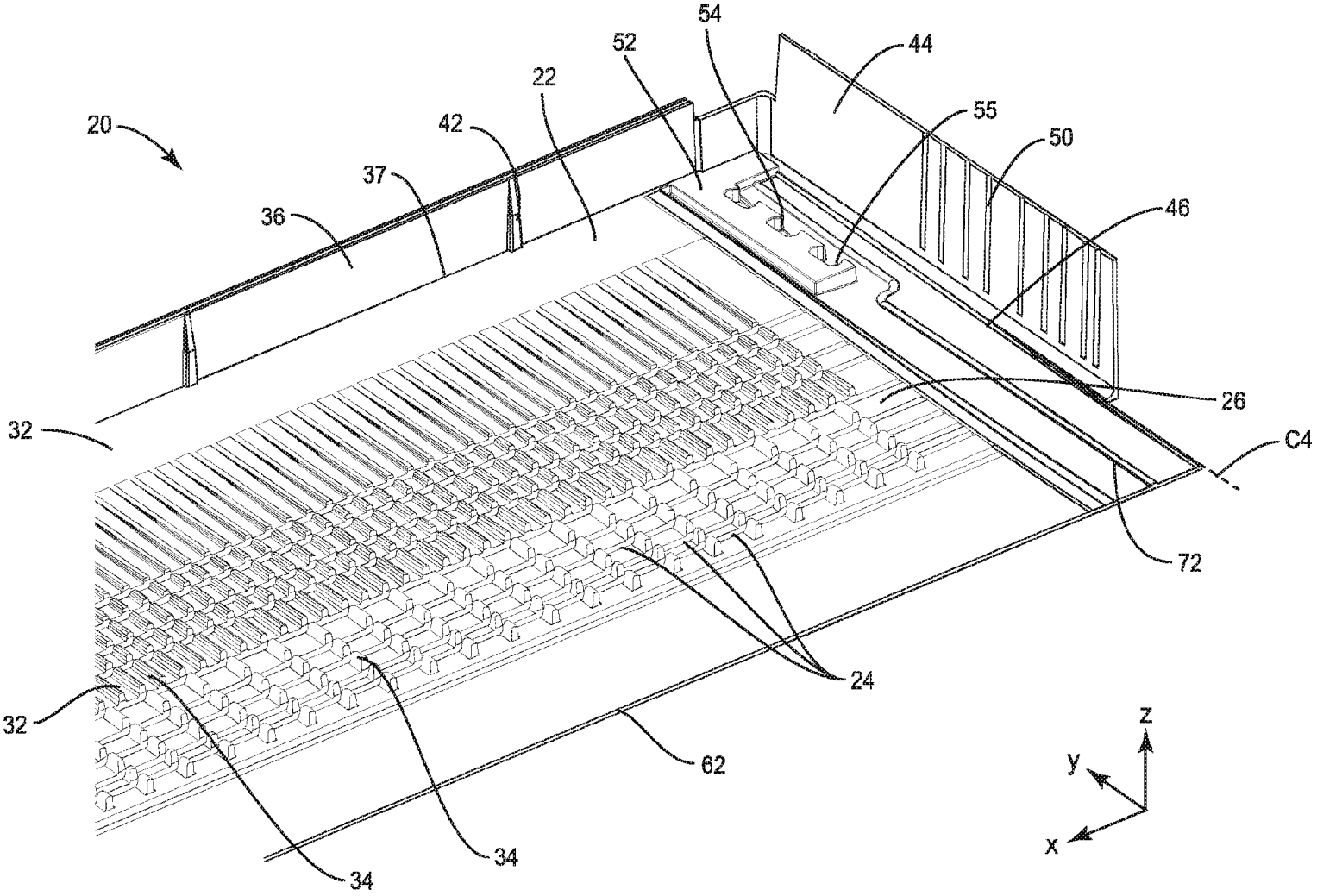
FIG. 5 is a detailed perspective view of a first end of the sill pan of FIG. 2.
Figure 6:
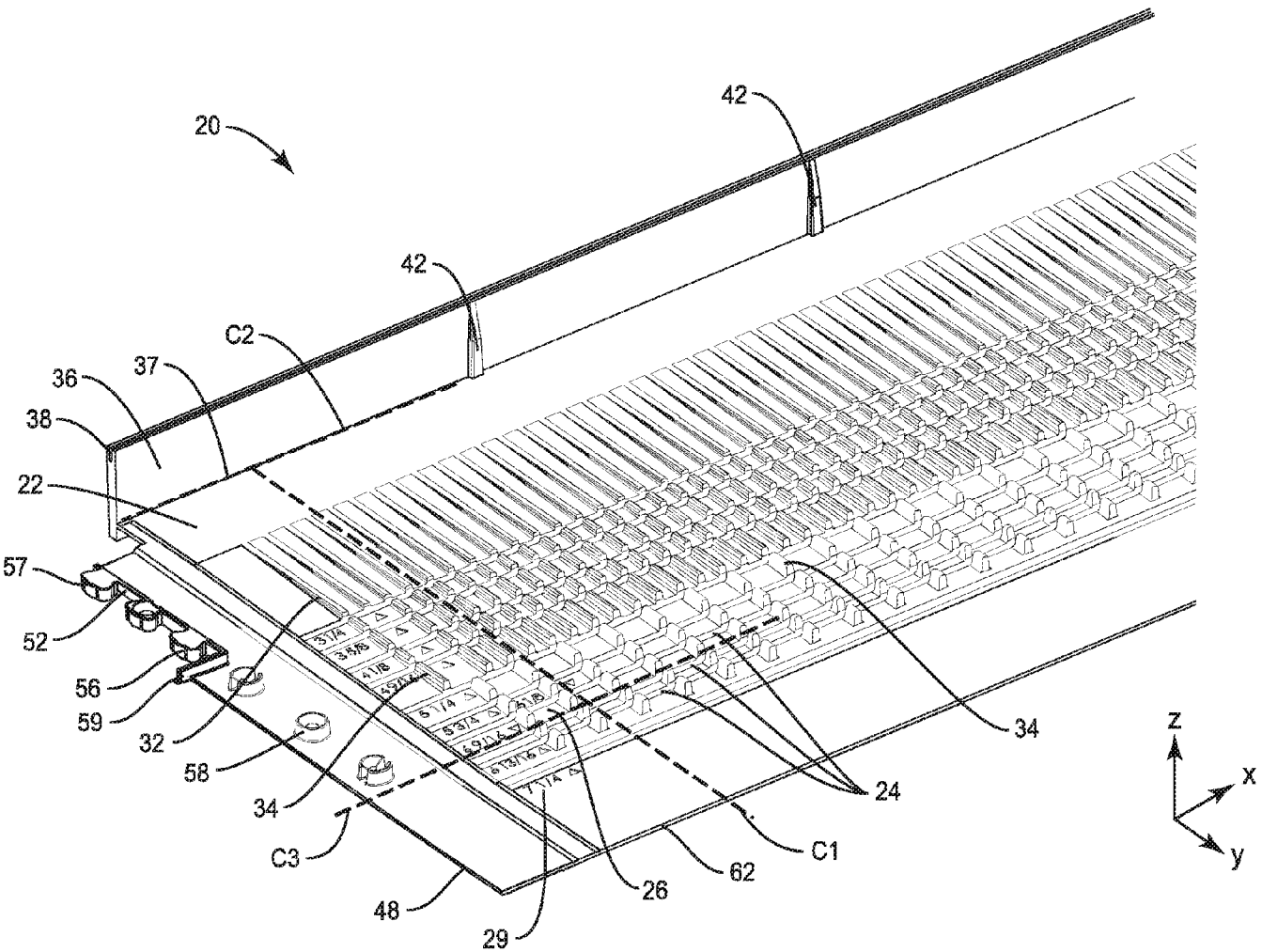
FIG. 6 is a detailed perspective view of a second end of the sill pan of FIG. 2.

FIG. 2 shows a top perspective view of a sill pan 20 according to an embodiment of the present disclosure. FIG. 3 shows a bottom perspective of the sill pan 20, FIG. 4 shows a cross section, and FIGS. 5 and 6 show enlarged top perspective views of the opposite ends of the sill pan. The sill pan 20 is shown in an initial configuration prior to being shaped for use within the rough opening 12 (FIG. 1). In one example, the sill pan 20 may be an integral unitary injection molded form useable individually or in combination with like sill pans to line the sub-floor 14 (FIG. 1) of an entryway 10 having a variety of lengths and/or widths. The sill may be a polymer material, such as polypropylene. Use of the sill pan 20 may assist with inventory control for builders or manufacturers because the sill pan 20 is intended to be provided with a single initial configuration. For example, separate left and right side versions are not expected to be necessary. By configuring the sill pan 20 to be adjustable in at least one of the width and length dimensions, the total number of necessary product size combinations is expected to decrease relative to the use of fixed dimension sill pans. As used herein, one or more of the dimensions may be adjustable, i.e. selectable, after the initial forming, e.g. molding, of the sill pan 20. The adjustment of the selected dimension(s) of the sill pan 20 is not necessarily reversible.

The sill pan 20 of the embodiment shown in FIGS. 2-7 is configured to facilitate both width adjustment and length adjustment. As shown in FIG. 2, the sill pan 20 includes a base 22 generally configured to extend the width of the rough opening 12 (FIG. 1) and at least a portion of the length of the rough opening. The base 22 of the present embodiment includes a plurality of bend lines 24 extending along the length direction of the sill pan 20 configured to assist with the ability for the base 22 to be selectively bent along one of the bend lines. The bend lines 24 may be score lines (e.g. areas of decreased thickness or reduced material) provided on one or both of a top surface 26 or a bottom surface 28 (FIG. 3) of the base 22. The bend lines 24 may be provided by areas of the sill pan 20 that have reduced material, e.g. less material thickness, relative to areas immediately adjacent to each of the bend lines. The bend lines 24 may be continuous or provided by a series of closely spaced dimples or perforations. In the case of perforations, the perforations should avoid allowing water to pass therethrough, for example by using very small perforations. In some embodiments, a separate material may be used to form the bend lines 24 that may facilitate bending of the base 22. The bend lines 24 may facilitate adjusting the width of the sill pan 20. To further assist with width adjustment, indicia 29 (FIG. 6) possibly in the form of dimensions, may be provided to assist with the proper selection of the desired bend line 24.

As possibly best shown in FIG. 4, the top surface 26 of the base 22 may be configured for draining water or moisture away from the interior of the rough opening 12 (FIG. 1). Thus, the top surface 26 may be sloped relative to a horizontal plane defined by the length and width directions (X- and Y-axes). To provide the top surface 26 with the desired slope, the base 22 may have a tapered thickness. Alternatively, in the illustrated embodiment, the bottom surface 28 may have a plurality of stand-offs 30 extending downward from the bottom surface. The height $H_s$ of the stand-offs 30 is tapered toward the exterior along the width direction. Therefore, when the stand-offs 30 rest on a substantially horizontal sub-floor 14 (FIG. 1), the top surface 26 is oriented with a slope toward the exterior of the entryway 10 relative to the horizontal sub-floor.

As shown in FIG. 3, the stand-offs 30 may be configured as spaced apart ribs each extending along the width direction of the base 22. The spaces between the stand-offs 30 may present regions for adjusting the length of the sill pan 20 as discussed below. Where each stand-off 30 is considered an elongated rib shape, the ribs may be interrupted by the bend lines 24, generating an area of reduced material compared to the presence of the stand-off 30 on either side of each bend line.

As shown in FIG. 4, while the top surface 26 may present a drainage slope, the base 22 may be configured to present a horizontal support surface 32 for supporting the threshold 18. In one embodiment, at least one support pad 34 extends upwardly from the top surface 26. The height $H_P$ of each support pad 34 relative to the top surface 26 may be tapered toward the interior along the width direction, such that the top of each support pad 34, opposite the top surface 26, forms a portion of the substantially horizontal support surface 32.

As shown in FIG. 6, similar to the stand-offs 30, the support pads 34 may present a plurality of spaced part ribs, each rib extending along the width direction. The spaces between the ribs may present regions configured to allow adjustment of the length of the sill pan 20. The support pads 34, where considered ribs, may be interrupted by the bend lines 24, creating an area of reduced material compared to the presence of the support pads 34 on opposite sides of each bend line.

As shown in FIG. 2, the sill pan 20 may include an interior flange 36 integral with and extending upwardly from an interior edge 37 of the base 22. At least some of the interior edge 37 is substantially parallel with the length direction and therefore parallel with the bend lines 24. The interior flange 36 may extend vertically upward along the height direction perpendicular to the support surface 32 and at an oblique angle to the sloped top surface 26.

As shown in FIG. 4, the top edge of the interior flange 36 may be at least partially provided with a groove 38 configured to position a nosing cover 40 over the interior flange. Reinforcement ribs 42 may be provided along the interior flange 36 to increase the rigidity of the interior flange. The reinforcement ribs 42 may maintain a gap between the interior flange 36 and an interior edge of the threshold 18 (FIG. 1). Thus, water that may pass over the interior edge of the threshold 18 may drain into the sill pan 20 instead of into the building.

Figure 2A:
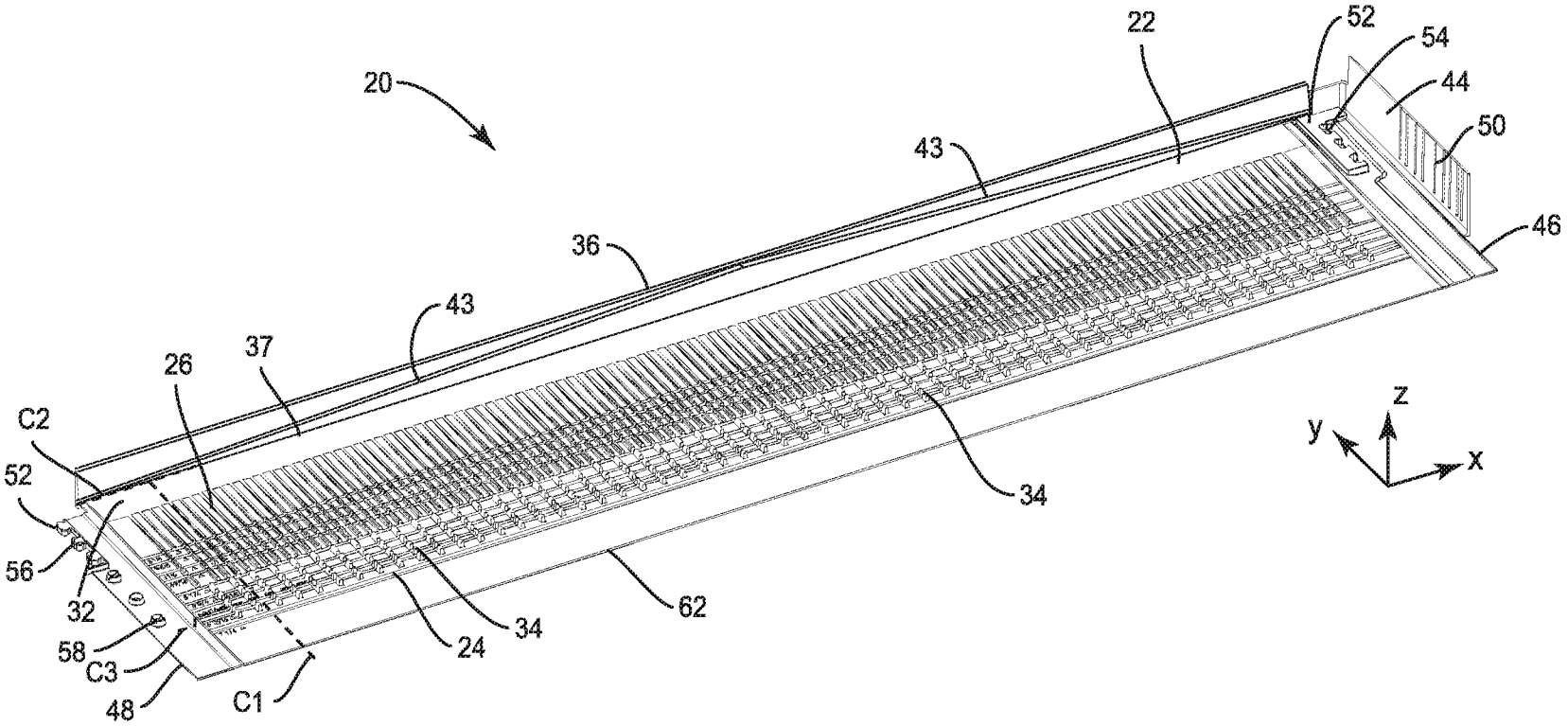
FIG. 2A is a top left perspective view of a sill pan according to another embodiment of the present disclosure.

FIG. 2A shows an alternative embodiment where the reinforcement ribs may be replaced with at least one drainage ramp 43. The drainage ramp 43 provides a slanted surface that may function to direct water away from the center of the sill pan 20. Much like the reinforcement ribs, the drainage ramps 43 are configured to create a slight gap between an interior edge of the threshold 18 (FIG. 1) and the face of the interior flange 36. Therefore, water that passes over the interior edge of the threshold 18 may be expected to fall onto the drainage ramp 43, where the water will be directed away from the center of the sill pan 20. The increased material thickness associated with the drainage ramp 43 may also reinforce the interior flange 36 in a similar fashion as provided by the reinforcement ribs 42 (FIG. 2). In some embodiments, sealant may be placed along the interior edge 37 of the base 22 prior to placement of the threshold 18 on the support surface 32. This sealant may help minimize air or water from being driven from the exterior, passing underneath the threshold 18 then up and over the interior flange 36 of the sill pan 20. Use of the drainage ramp 43 may help drain any water received from above when sealant may otherwise block the water from draining vertically downward and under the threshold 18.

Shown in FIG. 5, the sill pan 20 may also include an integral end flange 44 extending upwardly from a right side edge 46 of the base 22. The integral end flange 44 is pre-formed with the sill pan 20 in the initial configuration of the sill pan. While the integral end flange 44 is shown formed on the right side edge 46 of the sill pan 20, one skilled in the art will appreciate that the integral end flange could be formed on the left side edge 48 (FIG. 6) of the base and remain within the scope of the present disclosure. At least a portion of the right side edge 46 is substantially parallel with the width direction and therefore substantially perpendicular to the bend lines 24. The integral end flange 44 may extend vertically upward along the height direction, perpendicular to the support surface 32, and oblique to the sloped top surface 26. The integral end flange 44 may include indicia, such as integral score lines 50, extending along the height direction and corresponding to the bend lines 24 formed in the base 22.

As shown in FIGS. 5 and 6, at least one connector 52 of a first embodiment may be molded with the base 22 of the sill pan 20. The connector 52 may comprise a female connector portion 54 having at least one pocket 55 adjacent to the integral end flange 44 as seen in FIG. 5. The connector 52 may also comprise a male connector portion 56 near the left side edge 48 of the base, opposite of the integral end flange 44 as shown in FIG. 6. One skilled in the art will appreciate that the male and female connector portions may be swapped as to the left and right side edges 46, 48 of the base 22. The male connector portion 56 may have at least one projection 57. As discussed in more detail below, the male connector portion 56 of a first sill pan 20 may be engaged, e.g. by an interference fit, snap fit, or press fit, with the female connector portion 54 of a second sill pan. This engagement provides an assembly that spans a rough opening 12 having a length greater than the length of one sill pan 20. A guide post 59 (FIG. 6) may extend from the sill pan 20 as part of the connector 52 to help align adjacent sill pans and improve the connection between respective connector portions 54, 56.

Staying with FIG. 6, the base 22 may further comprise mounting bosses 58 configured to receive fasteners configured to anchor the sill pan 20 to the sub-floor 14 (FIG. 1). In one embodiment, each mounting boss 58 may allow the base 22 to self-seal around the fastener extending therethrough. This self-sealing may be a result of the material selected for the sill pan 20, particularly a polymer.

Figure 7:
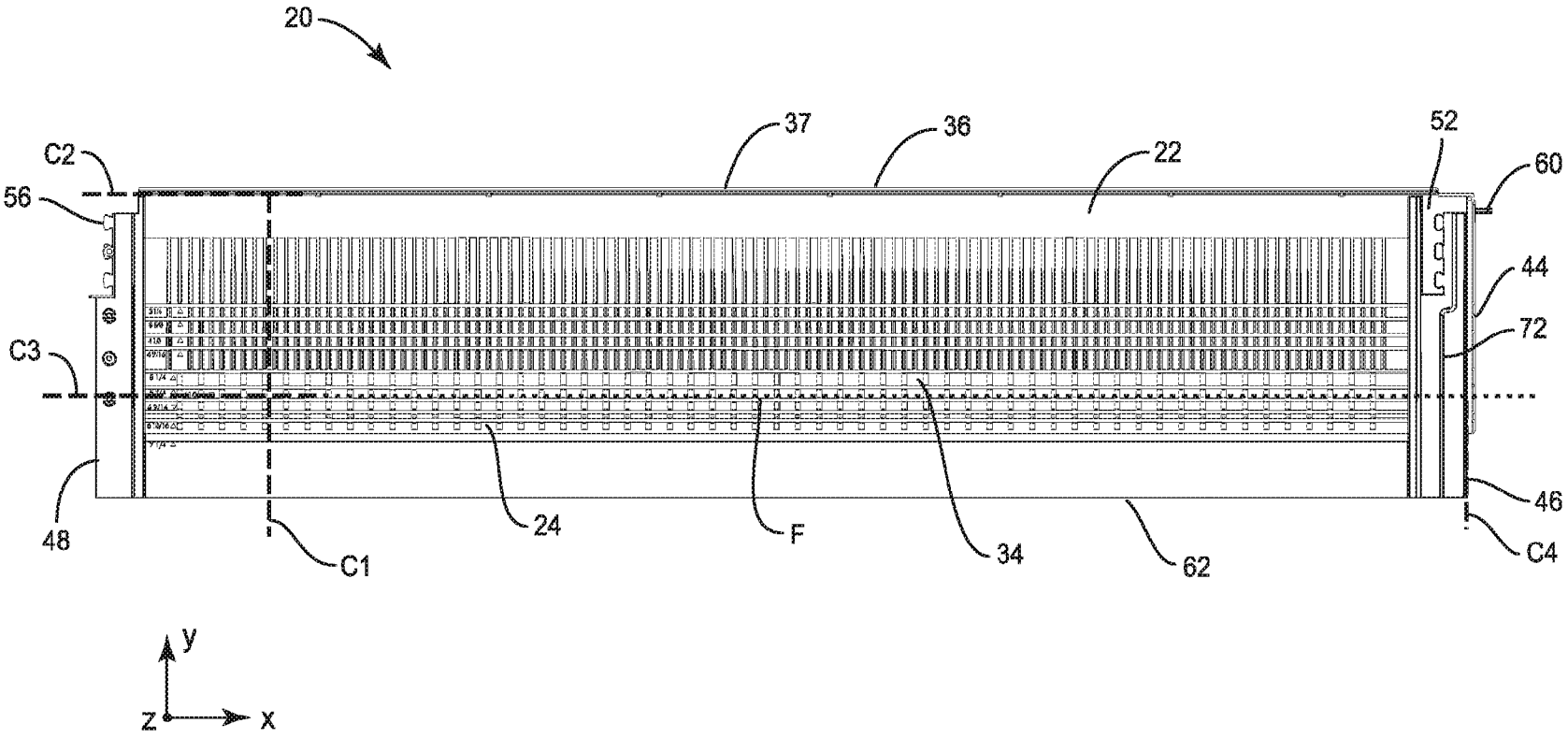
FIG. 7 is a top view of the sill pan of FIG. 2.

As shown in FIG. 7, the sill pan 20 may have an alignment tab 60 extending outwardly from the integral end flange 44. The alignment tab 60 generally extends along the length direction. The alignment tab 60 is offset from the interior flange 36 toward an exterior edge 62 of the sill pan 20. The alignment tab 60 is configured to abut an interior face of a stud 16 (FIG. 8D) such that the interior flange 36 can be properly positioned along the width direction within the rough opening 12.

Figure 8A:
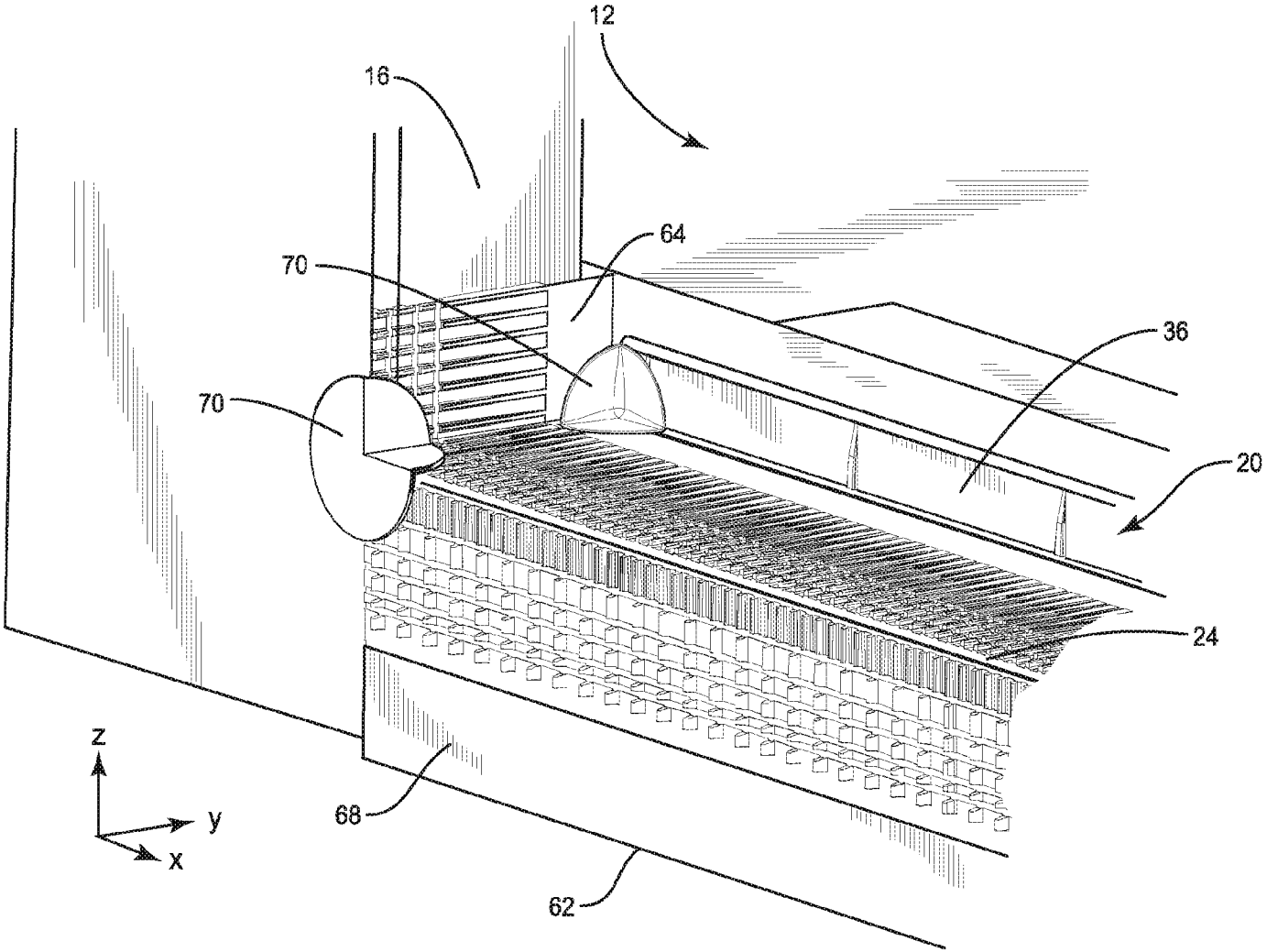
FIG. 8A is a partial exterior view of one end a completed sill pan in a rough opening.

Having described the structure of the sill pan 20, according to a first embodiment, in its initial configuration in terms of FIGS. 2-7, an exemplary method of sizing, configuring and installing the sill pan will now be discussed in more detail, beginning with forming a constructed end flange 64 (FIG. 8A) such that the sill pan has a length to match the rough opening 12. According to one embodiment, to complete the sill pan 20 for installation, the installer may determine the desired length of the sill pan, where the length is equal to the distance between the studs 16 plus an amount (e.g. 2 inches) substantially equal to a height of the constructed end flange 64. When the length is known, the installer may cut the base 22 perpendicular to the length direction at a distance from the integral end flange 44 substantially equal to the length (see example cut line C1 in FIG. 7). The base 22 may then be cut from the left side edge 48 of the base 22 along the length direction along the interior edge 37 (see example cut line C2 in FIG. 7). The left side edge 48 may be redefined after removing a portion of the sill pan 20 with the cut along C1. The base 22 may then be cut from the left side edge 48 along the length direction along a select bend line 24 (see example cut line C3 in FIG. 7), the select bend line 24 determined based on the width of the rough opening 12. The cuts along lines C2 and C3 may have magnitudes past cut line C1 (new left side edge 48) substantially equal to the height of the constructed end flange 64 (FIG. 8A). One of ordinary skill in the art will appreciate that similar results may be achieved by cutting along lines C1, C2 and C3 in any order. The constructed end flange 64 may be formed by folding the region of the base 22 found between cut lines C2 and C3 upward. Excess length of the interior flange 36 may be cut to size and/or used as a wing for securing the sill pan 20 to the rough opening 12. Excess length of the base 22 between C3 and the exterior edge 62 may be cut off or used as a wing for securing a portion of the sill pan 20 to the rough opening 12.

Figure 8B:
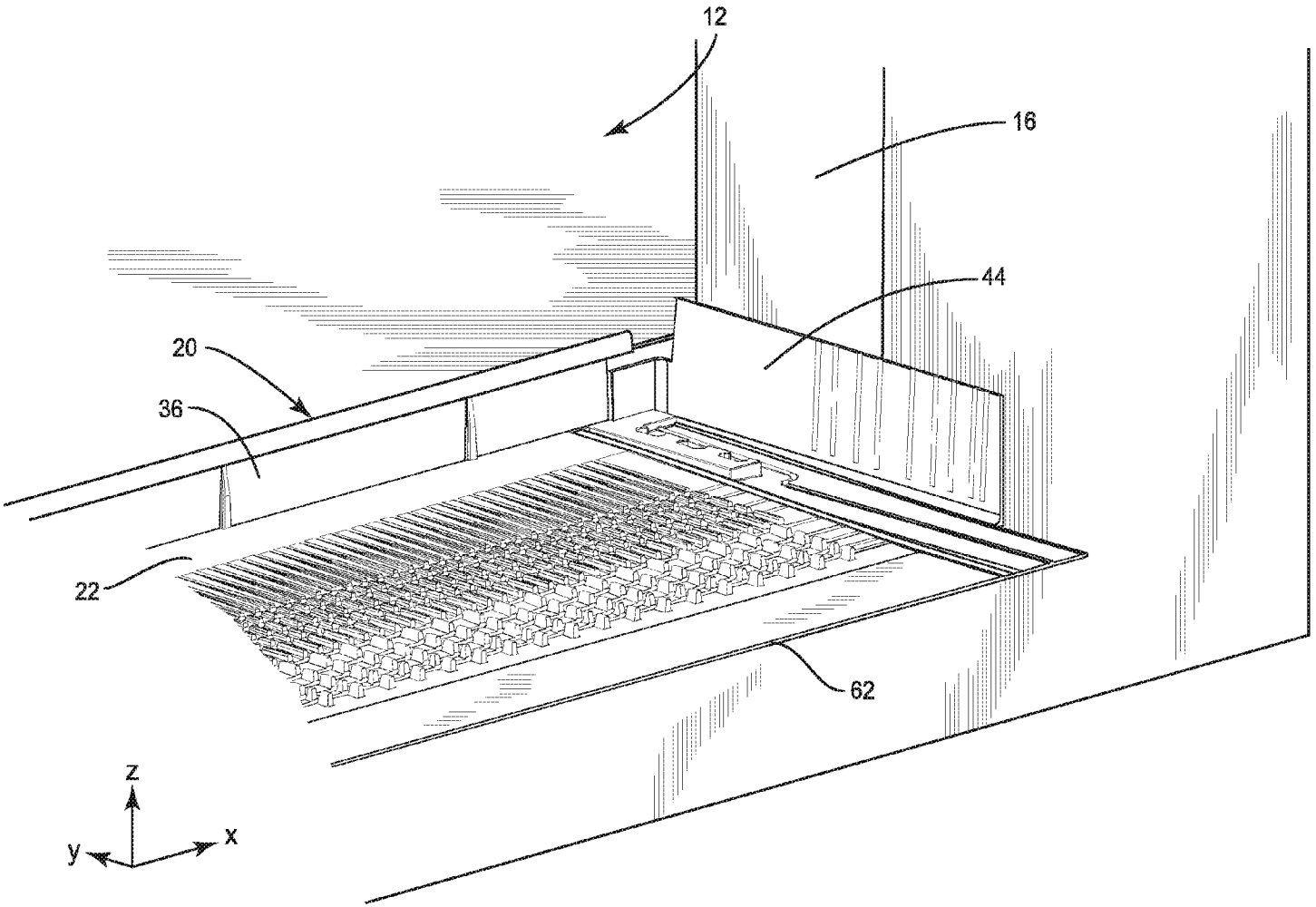
FIG. 8B is a partial exterior view of another end of an initial sill pan placed in a rough opening.
Figure 8C:
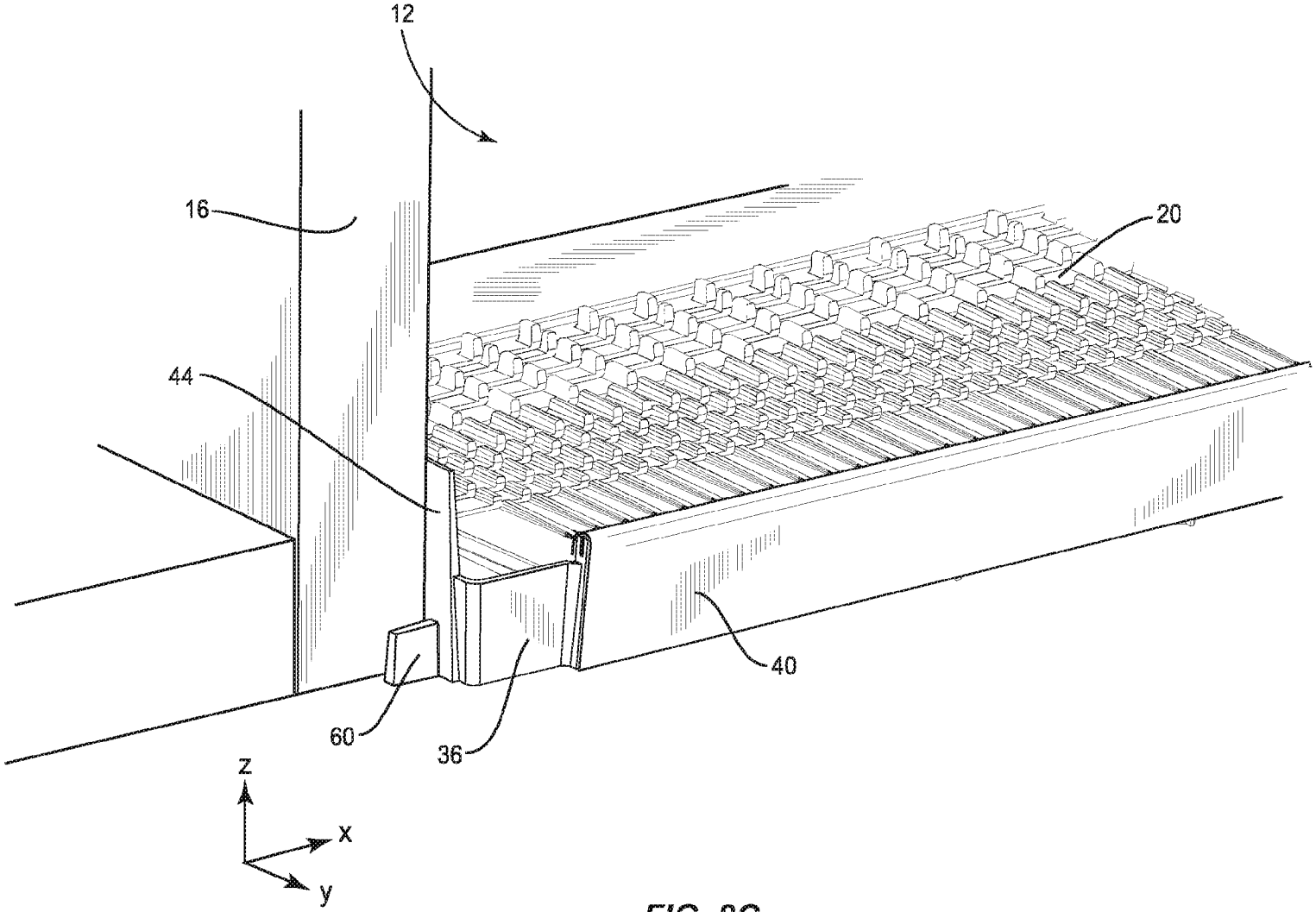
FIG. 8C is a partial interior view of one end of the sill pan placed in a rough opening.
Figure 8D:
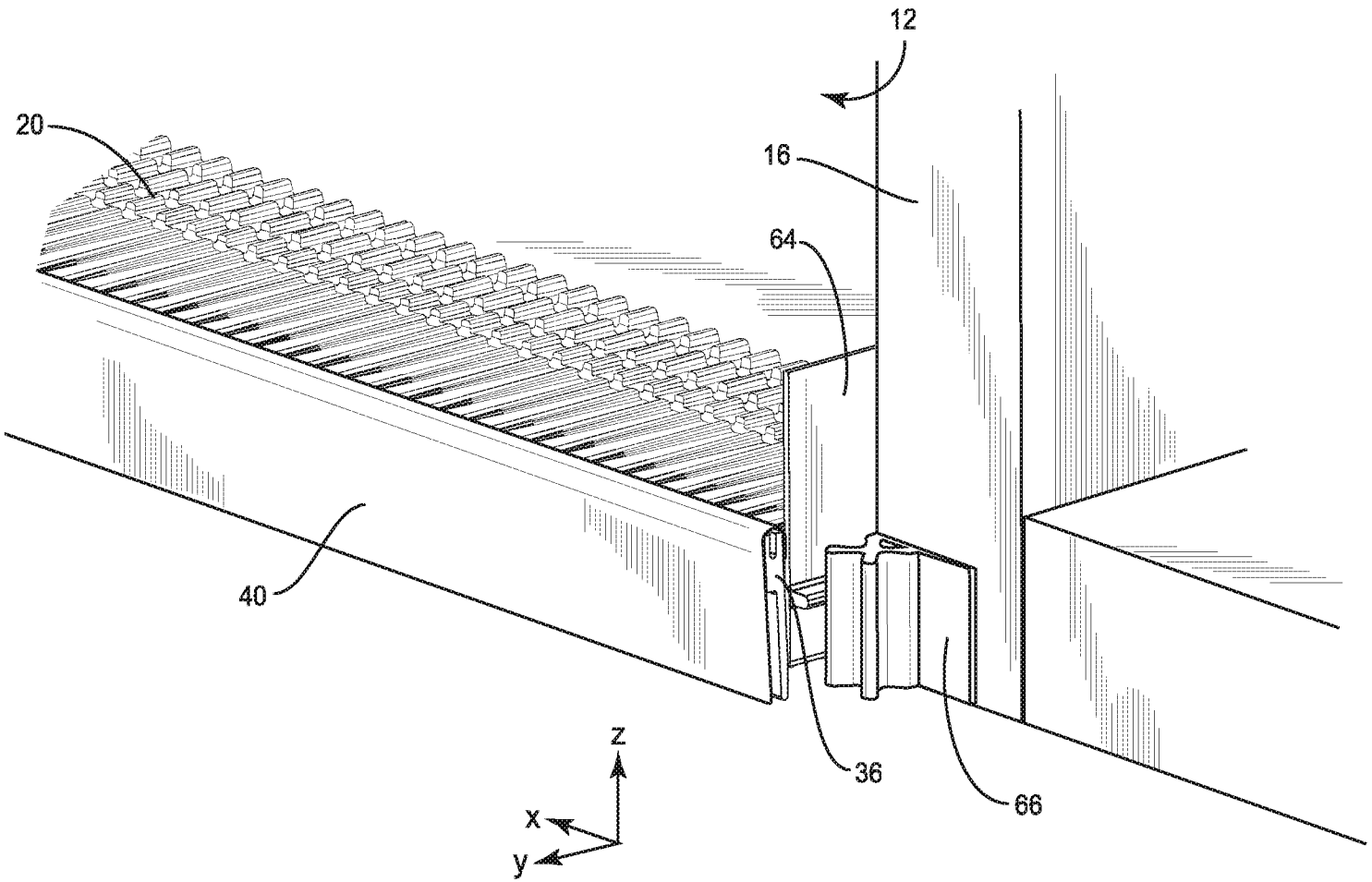
FIG. 8D is a partial interior view of another end of the sill pan placed in a rough opening.

As seen in FIG. 8D, an alignment spacer 66 may be attached to the interior edge of the rough opening stud 16 via a fastener. The alignment spacer 66 presents an abutment surface for the interior flange 36.

For the sill pan 20 of the present embodiment with both length and width adjustability, the right side edge 46 of the base 22 adjacent to the integral end flange 44 may also be prepared for the rough opening 12. To complete the side of the sill pan 20 with the integral end flange 44, the installer can cut along the bottom of the integral end flange 44 from the exterior edge 62 of the sill pan toward the interior edge 37 to proximate an appropriate bend line 24 as shown by example cut line C4 in FIG. 7. The appropriate bend line 24 may be predetermined by cut line C3 when forming the constructed end flange 64. Excess portions of the integral end flange 44 may be removed by cutting along the appropriate score line 50, such as along example cut line C5 shown in FIG. 4, which corresponds with the appropriate bend line 24.

As seen in FIGS. 8A-D, the completed sill pan 20 may be placed into the rough opening 12. The stand-offs 30 should rest upon the sub-floor 14 (not shown). The constructed end flange 64 substantially abuts a face of one of the studs 16 (FIG. 8A), and the integral end flange 44 substantially abuts a face of the other of the studs 16 (FIG. 8B). The sill pan 20 may be positioned relative to the width direction (y-axis) by positioning the alignment tab 60 and the alignment spacer 66 to abut an interior edge of respective studs 16 as shown in FIGS. 8C and 8D respectively.

As shown in FIG. 8A, a front flange 68 may be formed from the sill pan 20 of the first embodiment. The front flange 68 may be formed before or after the sill pan 20 is placed in the rough opening 12. The front flange 68 may be formed by folding an exterior region of the base 22 downwardly along the selected bend line 24 (see fold line F in FIG. 7). An area between the interior flange 36 and the selected bend line 24 (e.g. fold line F) may be referred to as a support region because the regain between the interior flange and the selected bend line is intended to support the threshold 18. The portion of the base 22 between the selected bend line 24 (e.g. fold line F) and the exterior edge 62 may be referred to as the front flange region because the portion between the selected bend line and the exterior edge is used to create the front flange 68.

The sill pan 20 may be secured within the rough opening 12 with fasteners passing through the sill pan and into the sub-floor 14, or fasteners passing through the sill pan and into the studs 16, or both. The fasteners may include screws, nails, staples or a combination thereof.

As seen in FIG. 8A, the open corners and edge joints of the sill pan 20 may be secured together in a substantially sealed manner with one or more flexible membranes 70 for at least partially sealing a respective joint. The flexible membrane 70 may include an adhesive layer for attachment to the sill pan 20. An example of a flexible membrane material is FlexWrap™ by Dupont™. In the illustrated embodiment, membranes 70 are provided between the interior flange 36 and the constructed end flange 64 as well as at the corners between the front flange 68 and each of the integral end flange 44 and the constructed end flange 64.

Figure 9A:
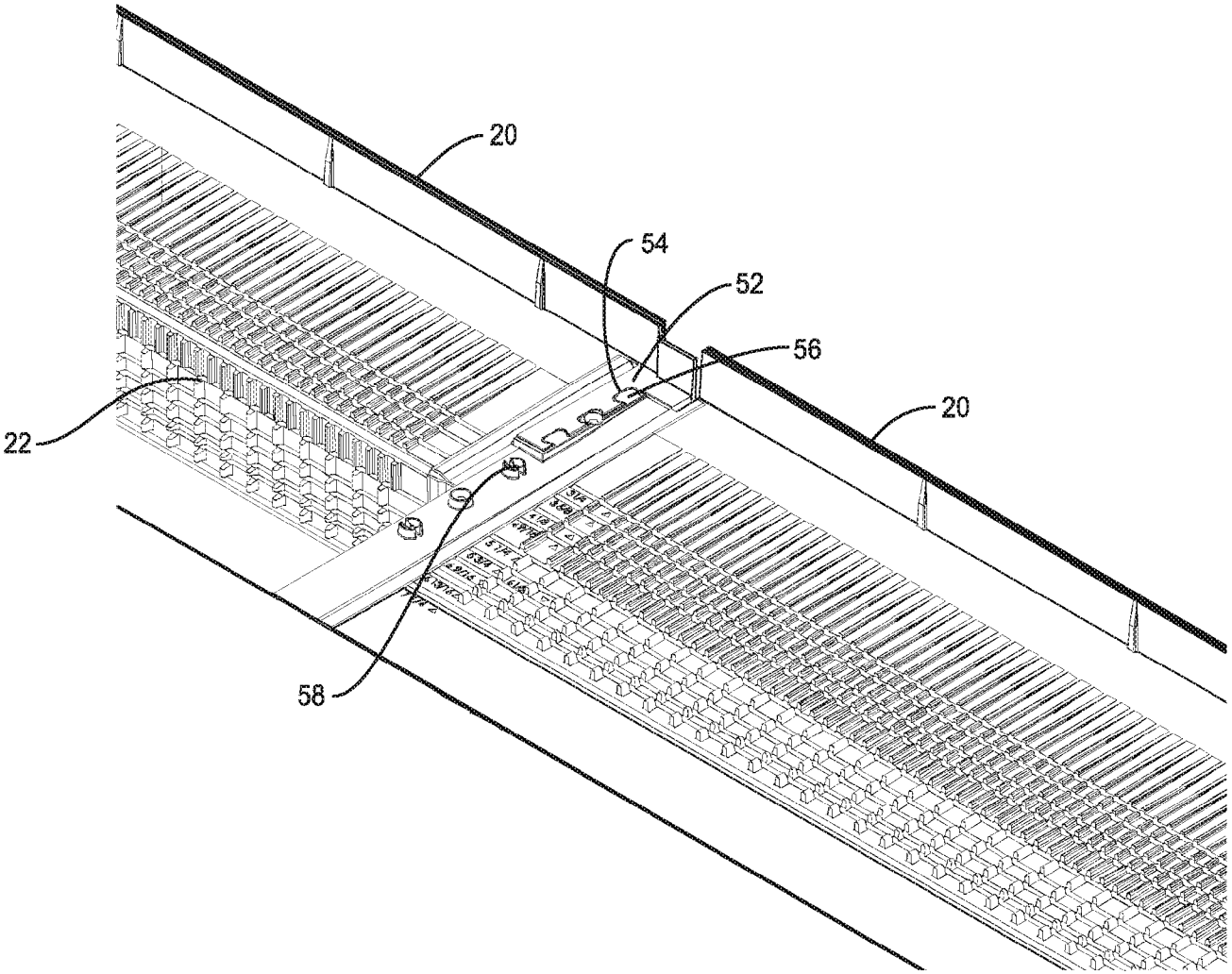
FIG. 9A is a detailed view of an initial connection between adjacent sill pans.
Figure 9B:
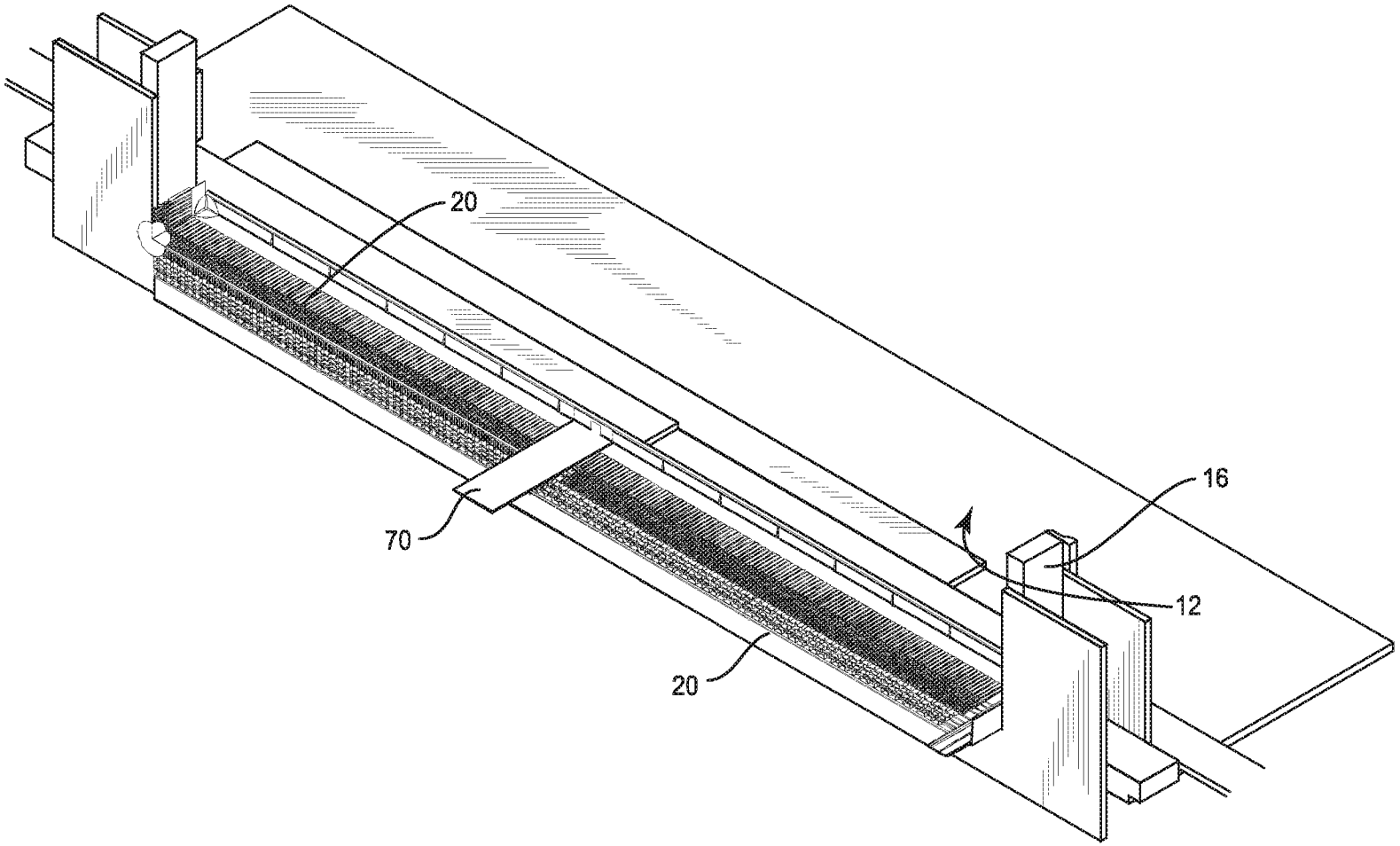
FIG. 9B is a perspective view of a sealed connection between adjacent sill pans.

FIGS. 9A and 9B illustrate an embodiment comprising two sill pans 20 attached together to match the length of a wide rough opening 12. To expose the male connection portion 56 of the connector 52 adjacent to the integral end flange (not shown) of one of the sill pans 20, the integral end flange may be removed from the base 22 by cutting along line C4 (FIG. 7) along the entire width of the sill pan.

With the integral end flange 44 of one of the sill pans 20 removed, the illustrated female connector portion 54 is accessible for engagement with the male connector portion 56 of the other sill pan. Preparation of a constructed end flange 64 opposite the remaining integral end flange 44 may proceed according to the process discussed above.

Once placed in the rough opening 12, fasteners (e.g. screws) may be driven through the mounting bosses 58, securing the both sill pans 20 to the sub-floor 14 due to an overlap of the sill pans in the area of the mounting bosses. When the sills pans 20 are screwed together, a raised ridge 72 (FIG. 7) on the top surface 26 of the first sill pan corresponds with a similar raised ridge 72 (FIG. 3) on the bottom surface 28 of the second sill pan 20. These ridges 72 facilitate sealing when an optional sealing pad is placed between the overlapping portions of the two sill pans 20. As seen in FIG. 9B, a flexible membrane 70 may be applied over the joint between the adjacent sill pans 20 to seal said joint.

When the sill pan(s) 20 are secured to the sub-floor 14 or the studs 16, or both, the sill pan is ready to receive the threshold 18 upon the support surface 32, and the nosing cover 40 may be installed into the groove 38 of the interior flange 36.

The sill pan 20 according to the embodiment shown and described with respect to FIGS. 2-7, along with the associated methods shown and described with respect to FIGS. 8 and 9, may be further summarized by the following paragraphs:

Paragraph 1: A sill pan, comprising:

a base;

an interior flange integral with and extending upwardly from an interior edge of the base;

a first end flange pre-formed with and extending upwardly from a side edge of the base; and a plurality of bend lines disposed along the base substantially parallel with the interior flange and substantially perpendicular to the first end flange, wherein a selected one of the plurality of bend lines divides the base into a support region adjacent to the interior flange and a front flange region, wherein a portion of the base is configured to be selectively bent downward along the selected one of the plurality of bend lines to create a front flange that remains attached to the support region.

Paragraph 2: The sill pan according to paragraph 1, wherein the sill pan comprises a second end flange, the second end flange comprising an end region of the base, located opposite the first end flange, bent upwardly relative to the support region, wherein selecting the location of bending of the second end flange allows for length adjustment of the sill pan.

Paragraph 3: The sill pan according to paragraph 1, wherein the first end flange comprises an alignment tab extending outwardly therefrom along the length direction and offset toward the exterior relative to the interior edge along the width direction for use in aligning the sill pan with a rough opening.

Paragraph 4: The sill pan according to paragraph 1, further comprising an alignment spacer.

Paragraph 5: A method of flashing the bottom of a rough opening with a sill pan, the sill pan having a base, an interior flange integral with and extending upwardly from an interior edge of the base, and an integral end flange pre-formed with and extending upwardly from a side edge of the base, the method comprising:

constructing another side flange by folding a first portion of the base upward, the portion located opposite the integral end flange;

creating a front flange by folding a second portion of the base downward along one of a plurality of bend lines in the base; and placing the sill pan within the rough opening.

Paragraph 6: The method of paragraph 5, further comprising providing an alignment spacer around an interior corner of the rough opening near the opposite side flange to align the sill pan with the rough opening.

Paragraph 7: The method of paragraph 5, further comprising applying flexible sealing membranes to a front and rear corner of the sill pan to seal pan joints.

Having described one embodiment of a sill pan, FIGS. 10-15 illustrate a sill pan 120 according to a second embodiment of the present disclosure. The sill pans 120 of the present embodiment are configured to be combinable to adjust the length of the completed sill pan by attaching two or more sill pans together much like the sill pans 20 of FIGS. 2-7. The sill pans 120 of the present embodiment also include features that allow the sill pans to be adjusted to rough openings 12 (FIG. 1) with lengths shorter than the sill pan. One of ordinary skill in the art will recognize that many features of the sill pans 20 according to the first embodiment will be optionally applicable to the sill pans 120 of the second embodiment. Similarly, one of ordinary skill in the art will recognize that features of the sill pans 120 according to the second embodiment will be applicable to sill pans 20 of the first embodiment.

As shown in FIGS. 10-15, the sill pan 120 is illustrated in an initial configuration prior to being shaped for use within the rough opening 12 (FIG. 1). Sill pans 120, unlike sill pans 20, are provided with a pre-determined width and pre-constructed front flange 168. Therefore, a base 122 of the sill pan 120 may be molded without the bend lines 24 (FIG. 2) found in sill pans 20 of the first embodiment. Even though the sill pan 120 has a fixed or predetermined width, the ability to create completed sill pans with increased or decreased length continues to provide benefits to builders in the form of reduced inventory in terms of separate components and separate dimensions.

Figure 12:
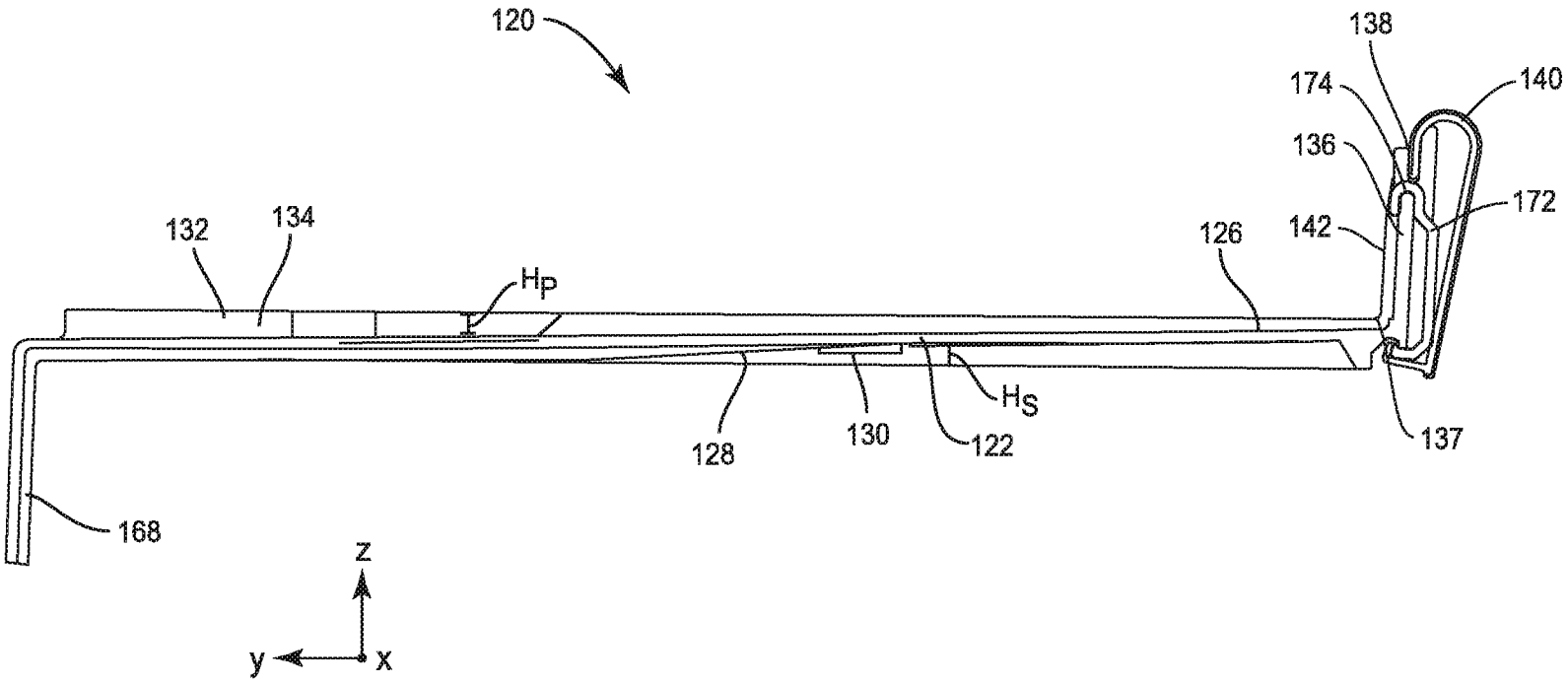
FIG. 12 is a cross sectional view of the sill pan of FIG. 10 with a nosing cover and attachment clip shown.

FIG. 12 shows a cross section of the sill pan 120. As shown, a top surface 126 of the base 122 may be configured for draining water or moisture away from the interior of the rough opening 12 (FIG. 1). Thus, the top surface 126 may be sloped relative to a horizontal plane defined by the length and width directions (X- and Y-axes). To provide the top surface 126 with the desired slope, the base 122 may have a tapered thickness. Alternatively, in the illustrated embodiment, a bottom surface 128 may have a plurality of stand-offs 130 extending downward from the bottom surface. The height $H_s$ of the stand-offs 130 is tapered toward the exterior along the width direction. Therefore, when the stand-offs 130 rest on a substantially horizontal sub-floor 14 (FIG. 1), the top surface 126 is oriented with a slope toward the exterior of the entryway 10 relative to the horizontal sub-floor.

Figure 11:
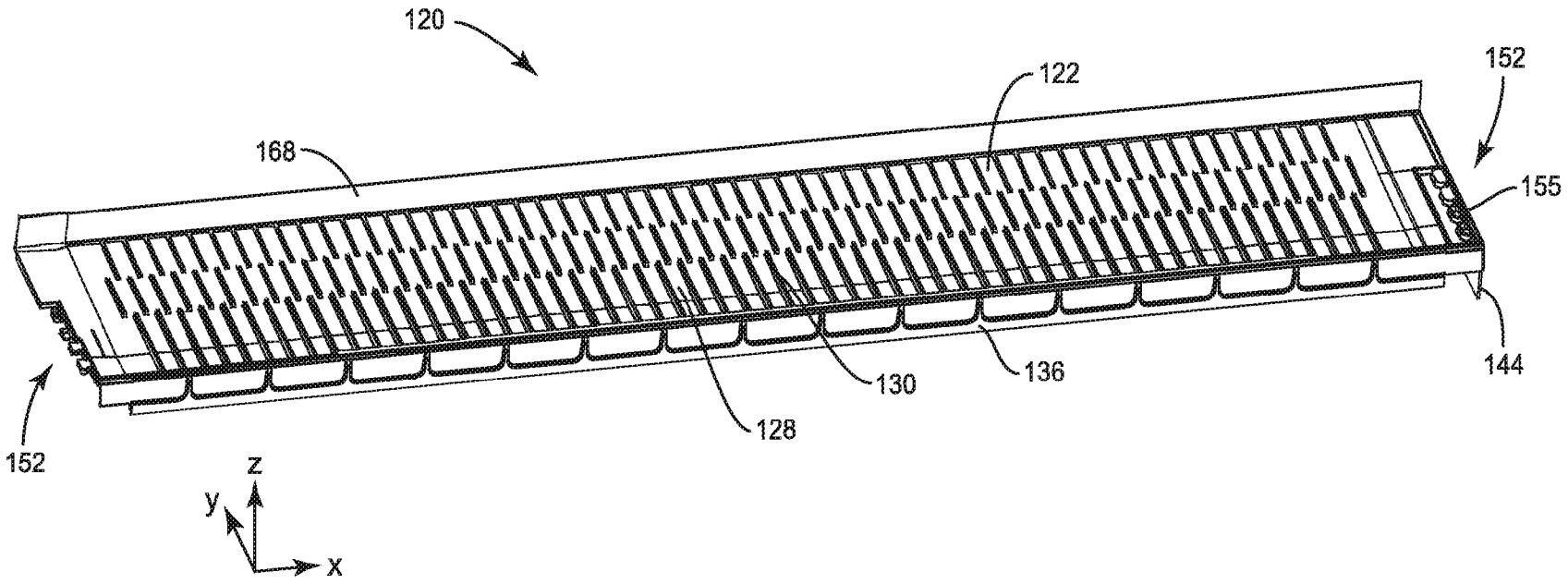
FIG. 11 is a bottom perspective view of the sill pan of FIG. 10.

As shown in FIG. 11, the stand-offs 130 may be configured as spaced apart ribs each extending along the width direction of the base 122. The spaces between the stand-offs 30 may present regions for adjusting the length of the sill pan 120 as discussed below.

As shown in FIG. 12, while the top surface 126 may present a drainage slope, the base 122 may be configured to present a horizontal support surface 132 for supporting the threshold 18 (FIG. 1). In one embodiment, at least one support pad 134 extends upwardly from the top surface 126. The height $H_P$ of each support pad 134 relative to the top surface 126 may be tapered toward the interior along the width direction, such that the top of each support pad 134, opposite the top surface 126, forms a portion of the substantially horizontal support surface 132.

Figure 10:
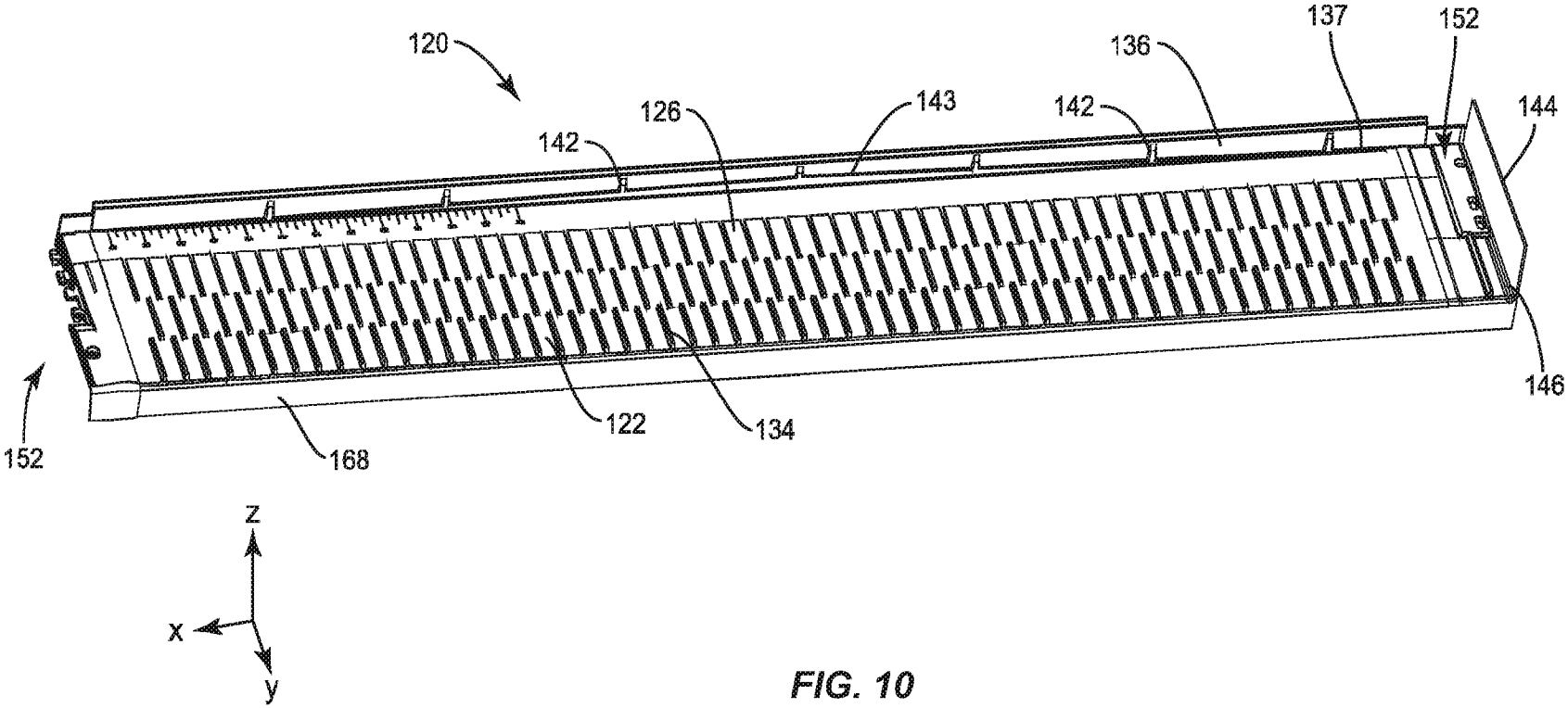
FIG. 10 is a top perspective view of a sill pan according to another embodiment of the present disclosure.

As shown in FIG. 10, similar to the stand-offs 130, the support pads 134 may present a plurality of spaced part ribs, each rib extending along the width direction. The spaces between the ribs may present regions configured to allow adjustment of the length of the sill pan 120.

As shown in FIG. 12, the sill pan 120 may include an interior flange 136 integral with and extending upwardly from an interior edge 137 of the base 122. At least some of the interior edge 137 is substantially parallel with the length direction. The top edge of the interior flange 136 may be at least partially provided with a groove 138 configured to position a nosing cover 140 over the interior flange. Reinforcement ribs 142 may be provided along the interior flange 136 to increase the rigidity of the interior flange. The reinforcement ribs 142 may maintain a gap between the interior flange 136 and an interior edge of the threshold 18 (FIG. 1). Thus, water that may pass over the interior edge of the threshold 18 may drain into the sill pan 20 instead of into the building.

As shown in FIG. 10, a drainage ramp 143 provides a slanted surface that may function to direct water away from the center of the sill pan 120. Water that passes over the interior edge of the threshold 18 may be expected to fall onto the drainage ramp 143, where the water will be directed away from the center of the sill pan 120.

Shown in FIG. 10, the sill pan 120 may also include an integral end flange 144 extending upwardly from a first side edge 146 of the base 122. The integral end flange 144 is pre-formed with the sill pan 120 in the initial configuration of the sill pan.

Figure 13:
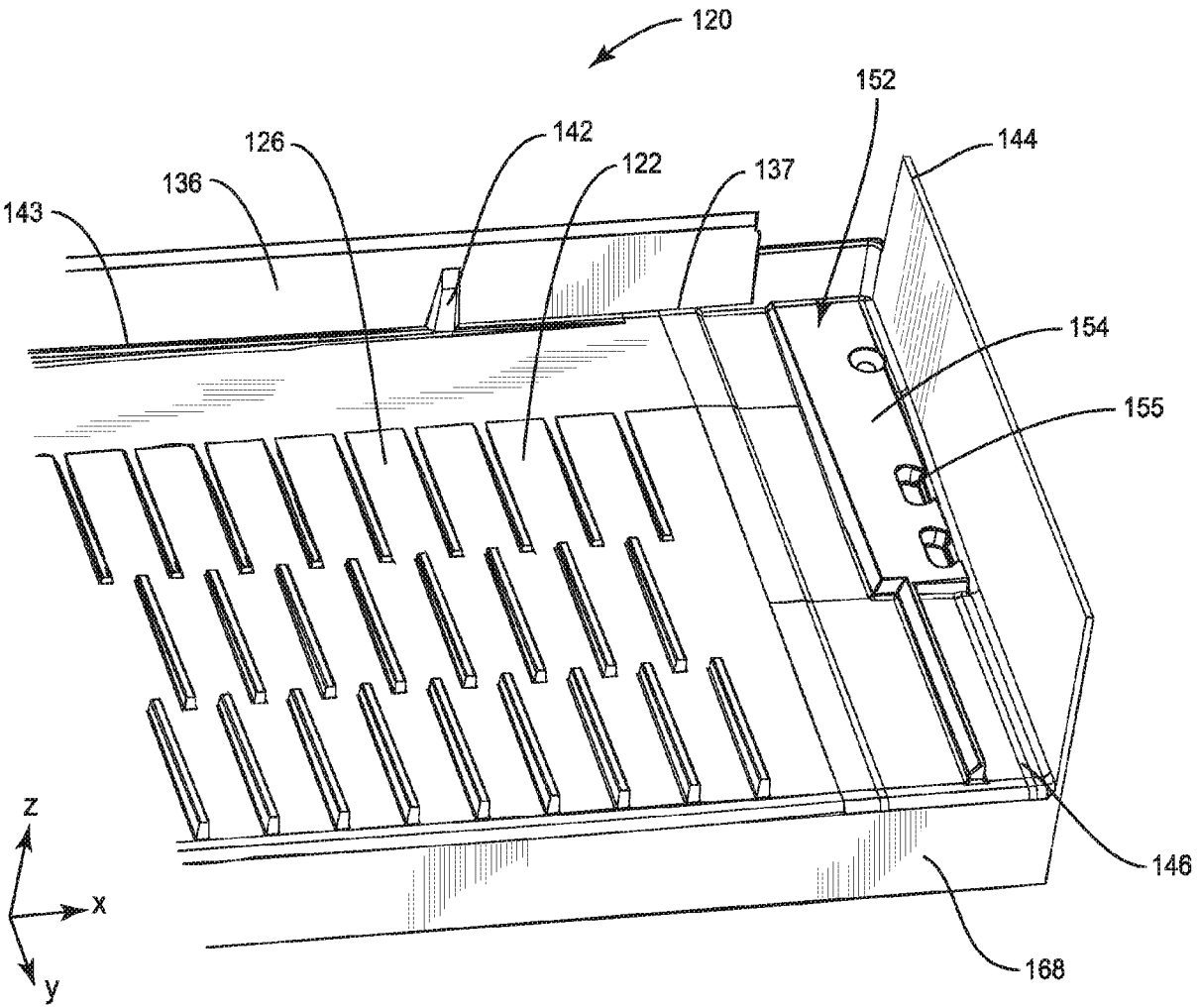
FIG. 13 is a detailed top perspective view of a first end of the sill pan of FIG. 10.
Figure 14:
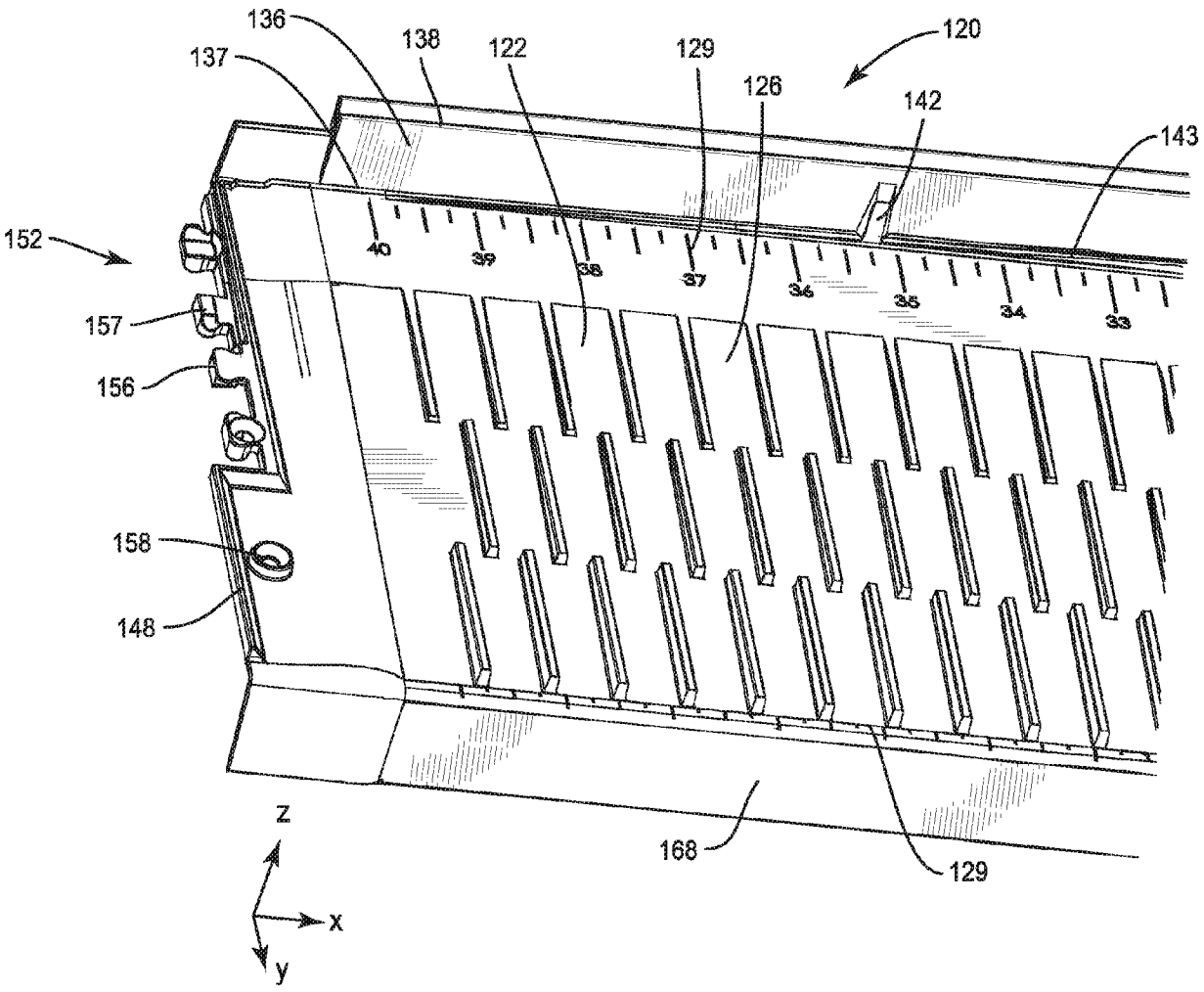
FIG. 14 is a detailed top perspective view of a second end of the sill pan of FIG. 10.
Figure 15:
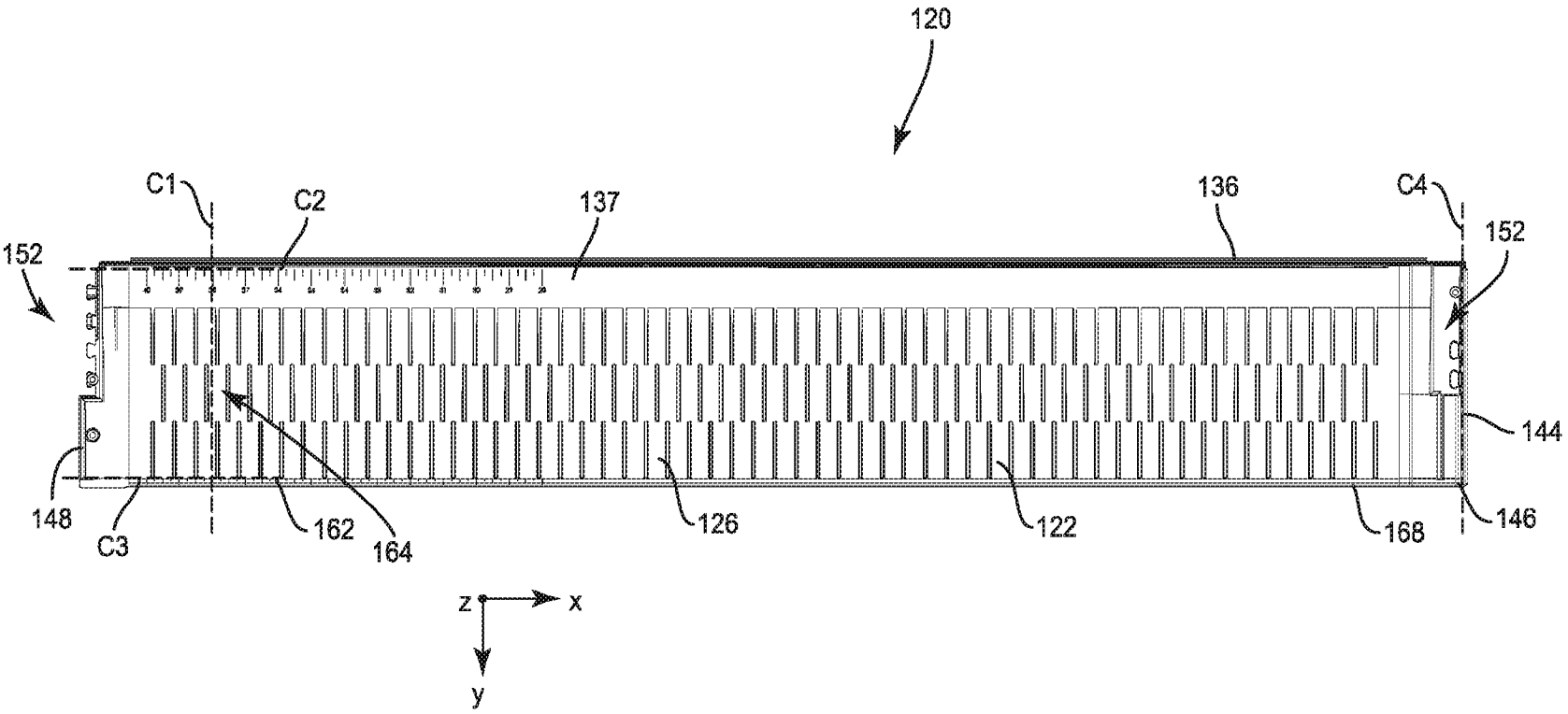
FIG. 15 is a top view of the sill pan of FIG. 10.

As shown in FIGS. 13 and 14, a connector 152 of a second embodiment may be molded with the base 122 of the sill pan 120. The connector 152 may include a female connector portion 154 adjacent to the integral end flange 144 as seen in FIG. 13. The female connector portion 154 may include a plurality of pockets 155. One or more of the pockets 155 may be formed into the upper surface of the base 122. Additionally, one or more of the pockets 155 may be formed into the lower surface of the base 122 as shown in FIG. 11. A male connector portion 156 of the connector 152 may be formed with the base 122 near the second side edge 148 of the base, opposite of the integral end flange 144 as shown in FIG. 14. The male connector portion 156 may include at least one projection 157. The projections 157 may have wedge features tapered upward or downward depending upon whether the respective projection is configured to engage a pocket 155 in the top or bottom of the base. Again, one of ordinary skill in the art will appreciate that it may be possible to arrange the male connector portion 156 adjacent to the integral end flange 144. The at least one projection 157 of the male connector portion 156 of a first sill pan 120 may be engaged, e.g. by an interference fit, snap fit, or press fit, with the at least one pocket 155 of the female connector portion 154 of a second sill pan as discussed further below. This engagement provides an assembly that spans a rough opening 12 (FIG. 1) having a length greater than the length of one sill pan 120.

Staying with FIG. 14, the base 122 may further comprise one or more mounting bosses 158 configured to receive fasteners configured to anchor the sill pan 120 to the sub-floor 14 (FIG. 1). In one embodiment, each mounting boss 158 may allow the base 122 to self-seal around the fastener extending therethrough. This self-sealing may be a result of the material selected for the sill pan 120, particularly a polymer.

As discussed above, the sill pan 20 shown in FIG. 6 includes indicia 29 configured to assist an installer with selecting the appropriate bend line 24 for adjusting the width of the illustrated sill pan. The sill pan 120 shown in FIG. 14 also includes indicia 129. The indicia 129 are configured to assist the installer with correctly adjusting the length of the sill pan 120 shown. One of ordinary skill in the art will understand that the length adjustment indicia 129 shown on the sill pan 120 of the second embodiment may also be applied to the sill pan 20 of the first embodiment because the sill pan 20 is similarly configured to have a selectable length.

Having described the structure of the sill pan 120, according to a second embodiment, in its initial configuration in terms of FIGS. 10-15, exemplary methods of sizing, configuring, and installing the sill pan will now be understood from the above discussion and discussed in more detail below.

Forming a constructed end flange (not shown) from the initial sill pan 120 of the second embodiment may occur in much the same fashion as forming the constructed end flange 64 from the sill pan 20 as shown and described with respect to FIGS. 7 and 8A above. For example, the installer may determine the desired length of the sill pan, where the length is equal to the distance between the studs 16 plus an amount (e.g. 2 inches) substantially equal to a height of a constructed end flange. When the length is known, the installer may cut the base 122 perpendicular to the length direction at a distance from the integral end flange 144 substantially equal to the length (see example cut line C1 in FIG. 15). If present, the length adjustment indicia 129 may assist with properly positioning cut line C1. The base 122 may then be cut from the second side edge 148 of the base 122 along the interior edge 137 (see example cut line C2 in FIG. 15). The base 122 may then be cut from the second side edge 148 along a front edge 162 (see example cut line C3 in FIG. 15). The cuts along lines C2 and C3 may have magnitudes past cut line C1 (or newly defined second side edge 148) substantially equal to the height of the constructed end flange. Again, one skilled in the art will appreciate that the first, second, and third cut lines C1, C2, C3 are not limited to a particular order. The constructed end flange may be formed by folding the region 164 of the base 122 found between cut lines C2 and C3 upward. Excess length of the interior flange 136 may be cut to size and/or used as a wing for securing the sill pan 120 to the rough opening 12 (FIG. 1). Excess length of the front flange 168 may be cut off or used as a wing for securing a portion of the sill pan 120 to the rough opening 12. One of ordinary skill in the art will appreciate that the sill pan 120 may be placed into and secured to the studs 16 (FIG. 1) and/or the sub-floor 14 in much the same way as the sill pan 20 reflected in FIGS. 8A-8D.

FIG. 9B illustrates an embodiment comprising two sill pans 20 attached together to match the length of a wide rough opening 12 (FIG. 1). The sill pans 120 of the second embodiment can be similarly joined together. To expose the connector 152 adjacent to the integral end flange 144 of one of the sill pans 120, the integral end flange may be removed from the base 122 by cutting along the first side edge 146 as shown by cut line C4 in FIG. 15.

Figure 16:
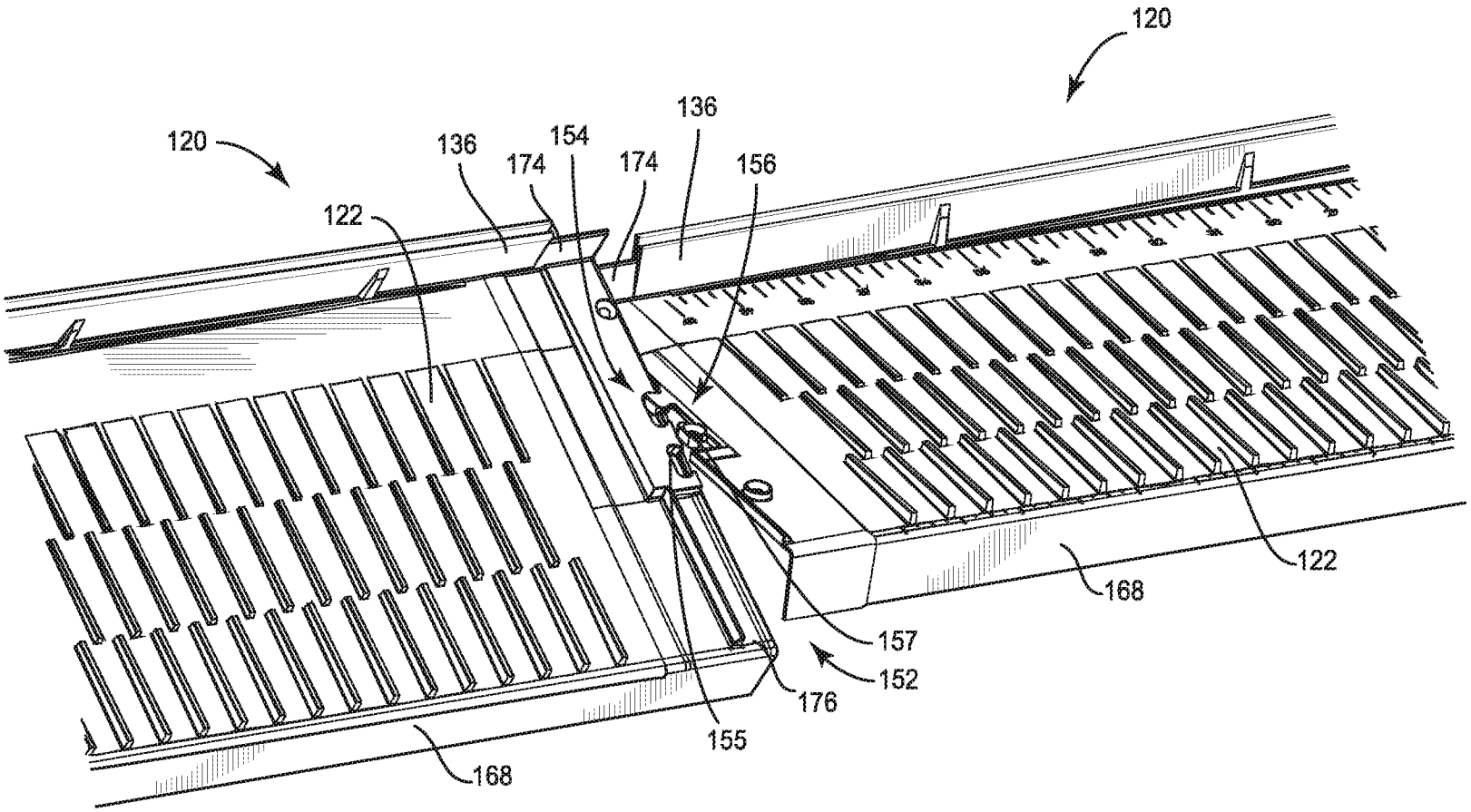
FIG. 16 is a partially assembled view of two adjacent sill pans of FIG. 10.
Figure 17:
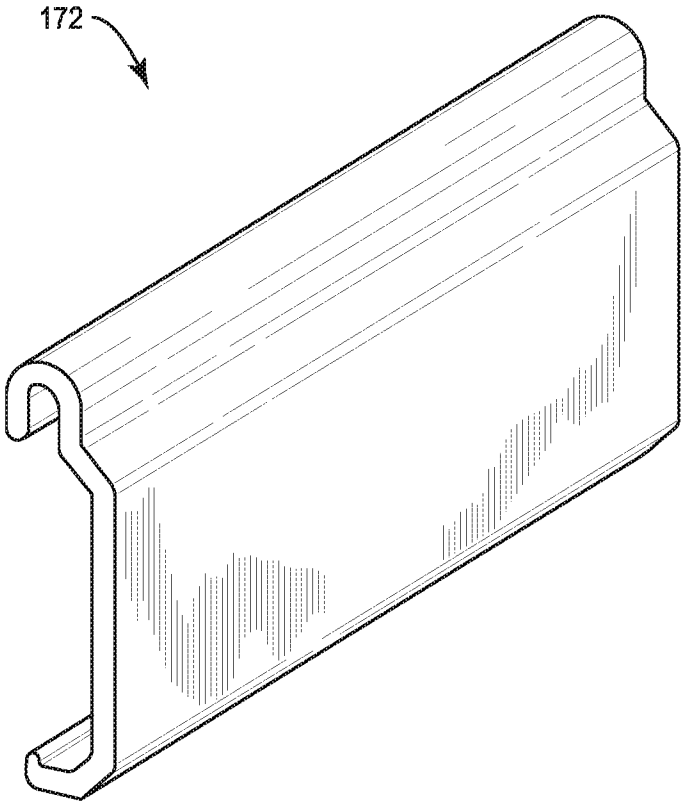
FIG. 17 shows an attachment clip optionally used to combine adjacent sill pans.

As seen in FIG. 16, with the integral end flange of one of the sill pans 120 removed, the illustrated female connector portion 154 is accessible for engagement with the male connector portion 156 of the other sill pan. In the illustrated embodiment, the two sill pans 120 are initially overlapped and angled with respect to one another as shown. Then, rotating the sill pans 120 into generally co-planar alignment (see FIGS. 9A and 9B) allows the projections 157 to enter the pockets 155 above and below the base 122 of the corresponding sill pan 120. To increase the security of the connection between the two adjacent sill pans 120, a clip 172, shown in FIGS. 12 and 17, may be used to cover the gap between the interior flanges 136 of the respective sill pans 120. As seen in FIG. 16, a portion 174 of the interior flange 136 adjacent to the female and male connector portions 154, 156 may be shorter than the remainder of the interior flange. This shorter portion 174 of the interior flange 136 may accommodate the clip 172 (FIG. 17) and allow the nosing cover 140 (FIG. 12) to extend at least partially over the clip 172.

As seen in FIG. 16, the connector 152 may include additional mating features to help facilitate the fit between the female connector portion 154 and the male connector portion 156. For example, a further recess 176 is shown adjacent to the female connector portion 154. Further, the profile of the base 122 and the front flange 168 is expanded in the region adjacent to the second side edge 148 to further facilitate the female connector portion 154 overlapping and nesting under the male connector portion 156.

Once placed in the rough opening 12, fasteners (e.g. screws) may be driven through the mounting bosses 158, securing the both sill pans 120 to the sub-floor 14 due to an overlap of the sill pans in the area of the mounting bosses. A flexible membrane 70 (FIG. 9B) may be applied over the joint between the adjacent sill pans 120 to seal said joint.

When the sill pan(s) 120 are secured to at least one of the sub-floor 14 or the studs 16, or both, the sill pan is ready to receive the threshold 18 upon the support surface 132, and the nosing cover 140 may be installed into the groove 138 of the interior flange 136.

Although the above disclosure has been presented in the context of exemplary embodiments, it is to be understood that modifications and variations may be utilized without departing from the spirit and scope of the invention, as those skilled in the art will readily understand. Such modifications and variations are considered to be within the purview and scope of the appended claims and their equivalents.

The invention claimed is:

1. A sill pan configured for use in spanning rough openings of various lengths, comprising:

a base *having a top surface, the top surface configured to contact and support a sill*;

a pre-formed end flange integral with and extending upwardly from a side edge of the base *such that the end flange extends above the top surface of the base*;

a first connector portion formed in the base adjacent to the pre-formed end flange; and a second connector portion formed in the base adjacent to an end opposite to the pre-formed end flange, wherein the sill pan is configured *to* be attachable to an adjacent sill pan with one of the first connector portion and the second connector portion, and wherein the first connector portion comprises one of a male connector portion or a female connector portion, and the second connector portion comprises the other of the male connector portion or the female connector portion.

2. The sill pan according to claim 1, wherein the first connector portion includes at least one pocket formed into a top surface of the base and at least one pocket formed into a bottom surface of the base.

3. The sill pan according to claim 1, further comprising an interior flange integral with and extending upwardly from an interior edge of the base.

4. The sill pan according to claim 3, wherein the base comprises a top surface, the top surface is configured to allow moisture to drain away from the interior flange.

5. The sill pan according to claim 3, wherein a plurality of bend lines are disposed along the base substantially parallel with the interior flange and substantially perpendicular to the pre-formed end flange, wherein a selected one of the plurality of bend lines divides the base into a support region adjacent to the interior flange and a front flange region, wherein a portion of the base is configured to be selectively bent downward along the selected one of the plurality of bend lines to create a front flange that remains attached to the support region.

6. The sill pan according to claim 3, wherein the interior flange comprises a groove formed into a top edge of the interior flange, the groove configured to position a nosing cover over the interior flange.

7. The sill pan according to claim 3, wherein the interior flange comprises at least one drainage ramp configured to receive water that passes over a threshold and directs said water toward the side edge of the sill pan.

8. The sill pan according to claim 1, wherein the base further comprises bosses configured to receive fasteners that anchor the sill pan, wherein the base comprises a polymer such that the bosses will allow the base to self-seal around the fastener extending therethrough.

9. The sill pan according to claim 1, wherein the end opposite to the pre-formed end flange is configured to be cut and bent upwardly to create a second end flange such that the sill pan is configured for use in a rough opening with a length less than a length of the sill pan.

10. An entryway, comprising:

a sub-floor and a pair of studs extending upwardly from the sub-floor to at least partially create a rough opening;

a sill pan according to claim 1, the sill pan on the sub-floor; and a threshold on the sill pan.

11. The entryway according to claim 10, further comprising at least one flexible membrane for at least partially sealing a joint between two adjacent portions of the sill pan.

12. The entryway according to claim 10, further comprising a nosing cover engaged with the sill pan via a groove formed into a top surface of an interior flange of the sill pan.

13. A sill pan configured for use in spanning rough openings of various lengths, comprising:

a base;

a pre-formed end flange integral with and extending upwardly from a side edge of the base;

a first connector portion formed in the base adjacent to the pre-formed end flange;

a second connector portion formed in the base adjacent to an end opposite to the pre-formed end flange; and an interior flange integral with and extending upwardly from an interior edge of the base, wherein the sill pan is configured *to* be attachable to an adjacent sill pan with one of the first connector portion and the second connector portion, wherein a plurality of bend lines are disposed along the base substantially parallel with the interior flange and substantially perpendicular to the pre-formed end flange, wherein a selected one of the plurality of bend lines divides the base into a support region adjacent to the interior flange and a front flange region, and wherein a portion of the base is configured to be selectively bent downward along the selected one of the plurality of bend lines to create a front flange that remains attached to the support region.

14. The sill pan according to claim 13, wherein the base comprises a top surface, the top surface is configured to allow moisture to drain away from the interior flange.

15. The sill pan according to claim 13, wherein the end opposite to the pre-formed end flange is configured to be cut and bent upwardly to create a second end flange such that the sill pan is configured for use in a rough opening with a length less than a length of the sill pan.

16. A sill pan configured for use in spanning rough openings of various lengths, comprising:

a base *having an interior edge and an exterior edge opposite the interior edge, the interior edge and the exterior edge configured to span a length of the rough opening, the base having a side edge extending between the interior edge and the exterior edge*;

a pre-formed end flange [integral with and] extending upwardly from [a] *the* side edge of the base;

[a first connector portion formed in the base adjacent to the pre-formed end flange;

a second connector portion formed in the base adjacent to an end opposite to the pre-formed end flange;] and an interior flange [integral with and] extending upwardly *directly* from [an] *the* interior edge of the base,

[wherein the sill pan is configured be attachable to an adjacent sill pan with one of the first connector portion and the second connector portion, and]

wherein the interior flange comprises a groove formed into a top edge of the interior flange, the groove configured to position a nosing cover over the interior flange.

17. The sill pan according to claim 16, wherein the base comprises a top surface, the top surface is configured to allow moisture to drain away from the interior flange.

18. The sill pan according to claim 16, wherein a plurality of bend lines are disposed along the base substantially parallel with the interior flange and substantially perpendicular to the pre-formed end flange, wherein a selected one of the plurality of bend lines divides the base into a support region adjacent to the interior flange and a front flange region, wherein a portion of the base is configured to be selectively bent downward along the selected one of the plurality of bend lines to create a front flange that remains attached to the support region.

[19. The sill pan according to claim 16, wherein the interior flange comprises a groove formed into a top edge of the interior flange, the groove configured to position a nosing cover over the interior flange.]

20. The sill pan according to claim 16, wherein the end opposite to the pre-formed end flange is configured to be cut and bent upwardly to create a second end flange such that the sill pan is configured for use in a rough opening with a length less than a length of the sill pan.

*21. The sill pan according to claim 16, wherein the end flange and the interior flange are unitarily formed with the base.*

* * * * *